(12) United States Patent
Terefe

(10) Patent No.: US 12,253,607 B1
(45) Date of Patent: Mar. 18, 2025

(54) MIRROR OBJECT DETECTION BASED ON CLUSTERING OF SENSOR DATA

(71) Applicant: Zoox, Inc., Foster City, CA (US)

(72) Inventor: Nehemia Girma Terefe, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 395 days.

(21) Appl. No.: 17/899,963

(22) Filed: Aug. 31, 2022

(51) Int. Cl.
*G01S 17/931* (2020.01)
*G01S 17/86* (2020.01)

(52) U.S. Cl.
CPC .......... *G01S 17/931* (2020.01); *G01S 17/86* (2020.01)

(58) Field of Classification Search
None
See application file for complete search history.

(56) References Cited

U.S. PATENT DOCUMENTS

| | | | | |
|---|---|---|---|---|
| 2013/0083201 A1* | 4/2013 | Takacs | .......... | H04N 23/80 348/169 |
| 2020/0284883 A1* | 9/2020 | Ferreira | .......... | G01S 17/10 |
| 2021/0181758 A1 | 6/2021 | Das et al. | | |
| 2021/0208263 A1* | 7/2021 | Sutavani | .......... | G01S 17/42 |

OTHER PUBLICATIONS

U.S. Appl. No. 17/405,865, filed Aug. 18, 2021, Scott M. Purdy, "Determining Object Characteristics Using Unobstructed Sensor Emissions", 54 pages.

* cited by examiner

*Primary Examiner* — Hitesh Patel
*Assistant Examiner* — Wenyuan Yang
(74) *Attorney, Agent, or Firm* — Lee & Hayes, P.C.

(57) ABSTRACT

This disclosure relates to detecting mirrored lidar returns and modifying lidar data using clustering techniques. In some examples, lidar data including a set of lidar points may be captured by a vehicle operating in an environment. The vehicle may combine the lidar data from numerous lidar devices to have a common frame of reference. In some examples, the vehicle may determine a cluster of the lidar points based on elevation data and azimuth data. The vehicle may compare range data of the clusters to determine whether such lidar points are indicative of a lidar return associated with an error (including multipath reflections). Based on determining that the difference in ranges of two lidar points is above a threshold value, the vehicle may determine how to use the data.

20 Claims, 9 Drawing Sheets

US 12,253,607 B1

MIRROR OBJECT DETECTION BASED ON CLUSTERING OF SENSOR DATA

BACKGROUND

Sensors, such as lidar sensors, generally measure the distance from a lidar device to the surface of an object by transmitting a light pulse and receiving a reflection of the light pulse from the surface of the object, which may be read by a sensor of the lidar device. The sensor may generate a signal based on light pulses incident on the sensor. lidar return signals may be attributable to reflections of objects, but portions of lidar signals also may be attributable to noise and/or other interfering signals (e.g., from the lidar device itself or from an external source). Within the context of autonomous vehicles, lidar systems may be used to detect objects in driving environments, analyze the objects, and/or determine routes for the vehicle to navigate through the environment safely and efficiently. For example, an autonomous vehicle may use lidar data to detect and avoid obstacles, such as pedestrians, within a planned driving path. However, in some cases, lidar noise and interference may cause errors in the analysis of lidar data, such as false-positive object detections. Such lidar data analysis errors can present challenges to safely and comfortably traversing through the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
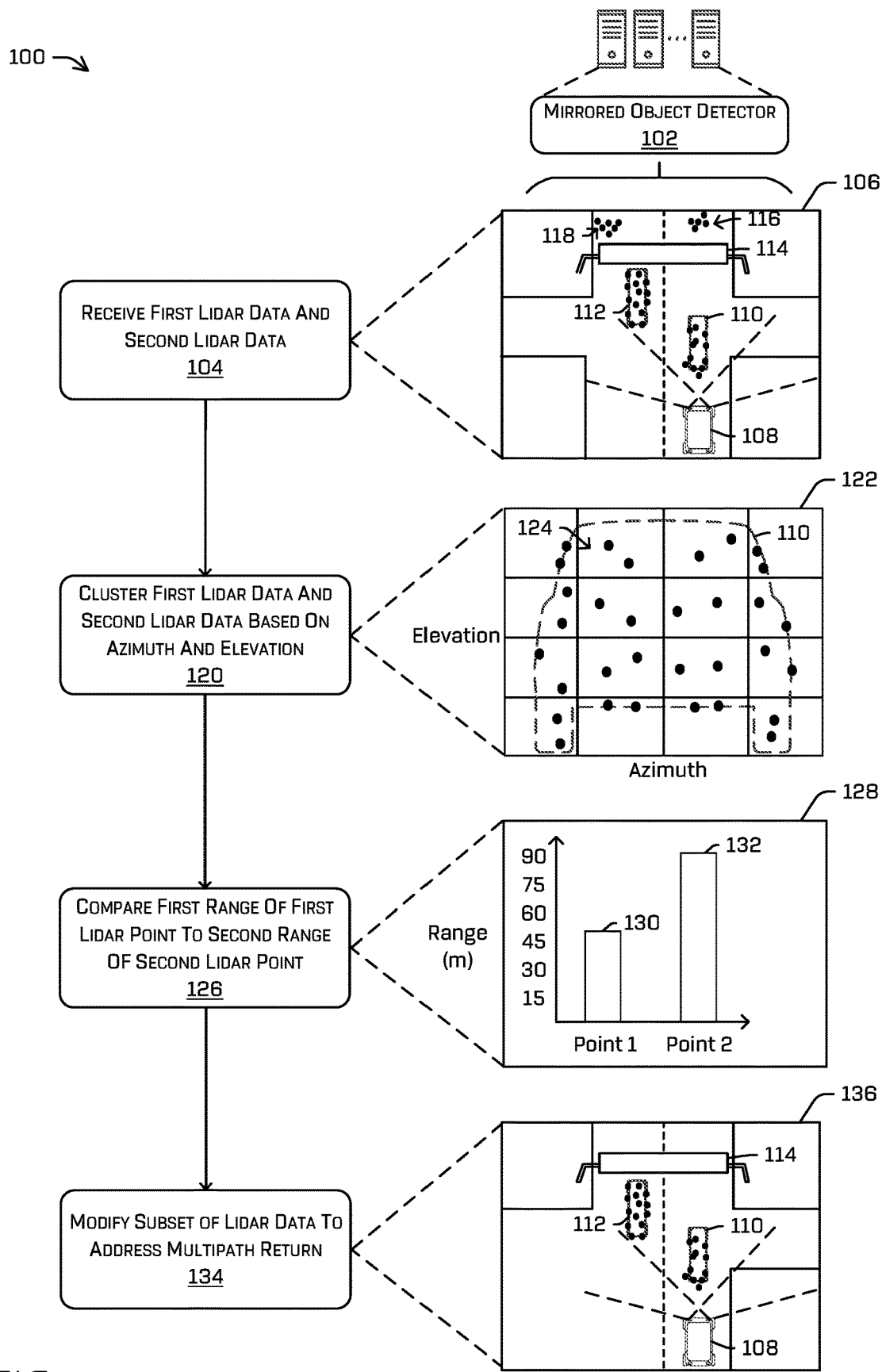
FIG. 1 is a pictorial flow diagram illustrating an example technique for modifying a received set of lidar points by clustering based on a range difference threshold, in accordance with one or more examples of the disclosure.

This disclosure relates to detecting lidar returns associated with an error (e.g., as may be caused by a multipath reflection or mirroring) and modifying and/or disregarding lidar data using clustering techniques. In some examples, lidar data including a set of lidar points may be captured by a vehicle operating in an environment. In such examples, the vehicle may include numerous lidar devices which may capture unique lidar data of the environment. The vehicle may combine the lidar data from the lidar devices to have a common frame of reference from a central location of the vehicle. In some examples, the vehicle may determine a region of overlap in which two lidar sensors capture lidar data of the same area. Based on the region of overlap, the vehicle may modify the lidar data to include the lidar points within a region of overlap, and exclude the lidar points outside the region of overlap. In some examples, the vehicle may determine a cluster of the lidar points (e.g., within the region of overlap) based on elevation data and/or azimuth data. The vehicle may compare the range data of the lidar points at each azimuth and elevation cluster to determine whether such lidar points are indicative of a lidar return associated with an error. For example, based on determining that the difference in ranges of two lidar points meets or exceeds a threshold value, the vehicle may modify the clustered lidar data to remove or mitigate the erroneous lidar return. As described in more detail below, the techniques described herein may improve vehicle safety and driving efficiency by ensuring accurate lidar data is being used and evaluated by the vehicle, thereby generating more efficient and accurate vehicle actions.

When an autonomous vehicle is operating within a driving environment, the vehicle may use lidar devices to capture lidar data of the surrounding environment. The autonomous vehicle may analyze the lidar data to detect and classify various objects within the environment, including dynamic objects that are capable of movement (e.g., vehicles, motorcycles, bicycles, pedestrians, animals, etc.) and/or static objects (e.g., buildings, road surface features, trees, signs, barriers, parked vehicles, etc.). In order to safely traverse a driving environment, an autonomous vehicle may include various components configured to detect objects and classify the objects. In some examples, a perception component of the autonomous vehicle may include any number of machine-learning (ML) models and/or components to detect and classify objects in the environment based on lidar data and/or other sensor data, evaluate the lidar data, and classify the objects, etc. For instance, the perception component may analyze lidar data to detect an object near the vehicle, and may evaluate various components of the lidar data (e.g., range, azimuth, velocity, elevation, etc.) to segment, classify, and track the object. One or more prediction and/or planning components of the autonomous vehicle may use the output object detection and classification components to determine a driving path for the vehicle relative to the object. Any of the various vehicle-based components described herein may use one or more ML models and/or heuristics-based components to perform the respective sensor data analysis and driving functionality described herein.

In some instances, lidar data received by lidar devices in an environment may inaccurately detect and/or misidentify objects based on light pulses reflecting off of multiple surfaces in the environment (e.g., multipath reflection). As an example, vehicles may use lidar devices to detect and/or identify objects within the environment. In some cases, a lidar device may emit a light pulse which may reflect off a single object within the environment and return to the lidar sensor. In such cases, based on analyzing the lidar data from the returned light pulse, the vehicle may determine a distance to the object from which the emitted light pulse reflected, as well as an azimuth of the object, an elevation of the object, etc. However, in other examples, from the time the light pulse is emitted to the time the light pulse returns to the lidar device, the light pulse may reflect off multiple objects within the environment. In such examples, the lidar data received based on the light pulse may be inaccurate, as some of lidar parameters may be indicative of multiple reflections, resulting in a "mirrored" lidar return. Accordingly, the lidar device may falsely detect and/or misclassify objects within the environment based on the inaccurate lidar data. Of course, this is a single example illustrating one or multiple errors associated with lidar data that may be resolved using the techniques described herein.

As an example illustrating a mirrored lidar return, a lidar device may emit a light pulse which may reflect off a large sign proximate to a roadway. Before returning to the lidar device, the light pulse may subsequently reflect off one or more other objects (e.g., a vehicle, a bridge, a traffic barrier, etc.) between the sign and the lidar device. In such examples, the azimuth and elevation parameters of the lidar data from the emitted light pulse may correspond to the large sign. Further, the range parameter of the lidar data may indicate that the detected object is at a distance (e.g., has a range) consistent with a sum of the distance the light pulse traveled from the overhead sign to the subsequent object, and back to the lidar device. As such, in addition to detecting the actual object, an autonomous vehicle relying on the lidar data may falsely determine a detection of an object at a location behind the actual object. In some examples, as the autonomous vehicle navigates throughout the environment, the autonomous vehicle may determine that the "mirrored" object (e.g., the false object detection behind the actual object) has a trajectory that may intersect or otherwise affect the trajectory of the autonomous vehicle. Consequently, the autonomous vehicle may disengage from the trajectory and/or transition from an autonomous driving mode to a manual driving mode based on the detection of the mirrored object.

To address the technical problems and inefficiencies of falsely detecting objects within an environment, the techniques described herein include lidar object detection using clustering. In some examples, a lidar data detection and/or analysis system (which may be referred to as a "mirrored object detector") may be configured to detect mirrored objects and/or lidar points in lidar data caused by light pulses reflecting off multiple surfaces within the environment. The mirrored object detector may be further configured to refine the lidar data based on the clustering such lidar data. Initially, the mirrored object detector may receive lidar data from a number of lidar devices mounted or installed at different locations on a vehicle and/or a same lidar at different times as the vehicle traverses the environment. In some examples, the lidar devices may be configured to capture lidar data while the vehicle traverses a driving environment. The lidar devices may be a same or different type of lidar device configured to capture various different types (or parameters) of lidar data, including but not limited to range data, azimuth data, elevation data, etc. In some examples, the lidar data may include a set of lidar points representative of lidar detections of physical objects in the environment.

In some examples, the mirrored object detector may combine the lidar points to have a common frame of reference. The vehicle may include a number of lidar devices which may capture unique lidar data (which, in some examples, may be a same lidar device at multiple instances in time). In some examples, a first lidar sensor may capture a first set of lidar points and a second lidar sensor may capture a second set of lidar points. The mirrored object detector may combine the first set of lidar points (e.g., from the first lidar sensor) with the second set of lidar points (e.g., from the second lidar sensor) to a single superset of lidar points. In some examples, the superset of lidar points may include a single frame of reference from a central location of the vehicle and may perceive objects from a common location.

In some examples, the mirrored object detector may determine a region of overlap associated with the lidar sensors. A region of overlap may be an area of the environment within which two lidar devices are both capable of capturing lidar data. In some examples, lidar devices may include varying fields-of-view based on the type of lidar device and/or the location in which the lidar device is mounted. In some examples, the mirrored object detector may modify the superset of lidar points based on the region of overlap. For example, the mirrored object detector may remove lidar points of the superset which are outside the region of overlap.

In some examples, the mirrored object detector may determine a subset of lidar points from the superset of lidar points. The mirrored object detector may determine the subset of lidar points based on a number of factors. In some examples, the mirrored object detector may determine (e.g., cluster) the subset of lidar points by clustering the lidar points of the superset based on elevation data and azimuth data. In such examples, after clustering the superset of lidar points based on elevation data and azimuth data, the mirrored object detector may identify two (e.g., or more) lidar points at each azimuth and elevation. In other examples, the mirrored object detector may identify three or more lidar points at an azimuth and elevation due to multipath lidar returns. However, this example is not intended to be limiting, the mirrored object detector may cluster the superset of lidar points before or after determining, and modifying, the lidar data based on the region of overlap.

In some examples, the mirrored object detector may compare a range difference of the radar points to a range difference threshold. The mirrored object detector may evaluate the lidar points of the subset (e.g., clustered based on azimuth and elevation) based on identifying a first lidar point (e.g., from the first lidar device) and a second lidar point (e.g., from the second lidar device) associated with a first azimuth value and a first elevation value. In some examples, the mirrored object detector may determine a range difference by comparing (e.g., subtracting) a first range of the first lidar point with a second range of the second lidar point. In such examples, the mirrored object detector may compare the range difference with a predetermined range difference threshold. The range difference threshold may be determined based on a type of detected object, distance to the detected object, vehicle pose, object pose, etc. If the range difference is within the range difference threshold, the mirrored object detector may determine that the lidar points are valid. If the range difference exceeds the range difference threshold, the mirrored object detector may determine that the lidar point with the larger range value (e.g., behind the actual object) is an inaccurate and mirrored lidar point.

In some examples, the mirrored object detector may modify the subset of lidar points based on the range difference exceeding the range difference threshold. Based on determining that the range difference exceeds the range difference threshold, the mirrored object detector may modify the subset of lidar points. In some examples, the mirrored object detector may modify the lidar points based on a variety of techniques. Such techniques may include removing/discarding the inaccurate and mirrored lidar point, assigning a low confidence level to the inaccurate and mirrored lidar point, or other similar techniques. Upon modifying the subset of lidar points, the mirrored object detector may send the modified subset of lidar points to perception, prediction, and/or planning components for further processing. In such examples, the modified subset of lidar points may be analyzed and processed in detecting objects, classifying objects, predicting trajectories, and/or planning future vehicle actions.

Additionally or alternatively, the mirrored object detector may detect mirrored objects and/or lidar points based on analyzing detected objects. As described above, the mirrored object detector may generate the subset of lidar points by clustering the modified cluster based on azimuth data and elevation data. Further, the mirrored object detector may determine detected objects within the environment based on the subset of lidar points. In some examples, the detected objects may include a number of lidar points. In such examples, the mirrored object detector may identify a first lidar point and a second lidar point of the subset at a particular azimuth and elevation. The mirrored object detector may determine whether the first lidar point and the second lidar point are associated with the same detected object. In some examples, if the first lidar point and the second lidar point are associated with different detected objects, then the mirrored object detector may identify one of the lidar points as a mirrored lidar point and/or associated with a mirrored object. If the first lidar point and the second lidar point are associated with a same detected object, then the mirrored object detector may identify the lidar points as valid. Based on determining that the first lidar point and the second lidar point are associated with different detected objects, the mirrored object detector may modify the subset of lidar points. In such examples, the mirrored object detector may modify the subset of lidar points using similar techniques as described above. Further, the mirrored object detector may modify the subset of lidar points by removing the lidar points of the subset that are associated with the mirrored detected object.

Additionally or alternatively, the mirrored object detector may detect mirrored objects and/or lidar points based on analyzing image data of the environment. In some examples, the vehicle may include a number of image capturing sensors (e.g., cameras) configured to capture image data of the environment. Based on receiving an indication that one of the lidar points may be a mirrored lidar point, the mirrored object detector may analyze the corresponding region of the image data (e.g., the image region corresponding to the same azimuth and elevation range of the lidar object detection) to determine and/or confirm whether the object detected using the lidar devices is present at the same location within the image data. In such examples, the mirrored object detector may determine a location of the detected object based on the parameters of the mirrored lidar point. Further, the mirrored object detector may access image data to determine and/or verify that the object identified by the lidar data is not present at the indicated location within the image data. Based on confirming the absence of the detected object, the mirrored object detector may modify the second subset of lidar points. In some examples, the mirrored lidar detector may modify the subset of lidar points using similar techniques as described above.

In some examples, the techniques described herein to detect mirrored lidar points can also be used for analyzing sensor data captured by other sensor types, such as radar sensors. In such examples, similar or identical techniques may be used to detect mirrored radar returns and modify radar data using clustering techniques.

As illustrated by these examples, the techniques described herein can improve the functioning, safety, and efficiency of autonomous and semi-autonomous vehicles operating in various driving environments. The use of the clustering techniques described herein may allow the vehicle to more efficiently and accurately detect errors within lidar data (e.g., multipath, mirrored objects, etc.) captured by lidar devices on the vehicle. For example, an autonomous vehicle may detect a number objects, some of which may be a mirrored object. Further, techniques described herein allow the autonomous vehicle to identify the detected object as a mirrored object, and therefore the autonomous vehicle does not need to alter its trajectory, stop abruptly, or disengage the autonomous vehicle from an autonomous mode. The mirrored object detector may improve vehicle safety and driving efficiency by improving the accuracy of lidar data parameters which can be used to determine a more accurate representation of a vehicle's surrounding environment and to perform safe and efficient driving maneuvers within the environment.

The techniques described herein also may reduce the processing load and/or memory overhead required by the vehicle to analyze the lidar data of the environment. By modifying the subset of lidar points to exclude lidar points outside a region of overlap, the mirrored object detector may reduce the number of lidar points to evaluate, thereby allowing the mirrored object detector to quickly process lidar points detections in order to identify mirror lidar points. Thus, by reducing the number of lidar points to consider, the mirror object detector may reduce the size of data to be processed. These techniques can also reduce the amount of lidar data processing time and overhead, without reducing the lidar data accuracy (or by minimizing any reduction of accuracy) of detecting mirrored lidar points, which can reduce the latency of processing components. Reducing latency can improve safety outcomes and/or comfort levels by controlling an autonomous vehicle, for example, by altering the vehicle trajectory or performing other driving maneuvers safely in the environment.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may provide an indication of whether it is safe to perform various maneuvers. In other examples, any or all of the techniques described herein may be implemented in other machine vison systems, such as security systems, object inspection and/or quality assurance systems, environment monitoring systems, etc. Moreover, even though the vehicles described herein are depicted as land vehicles, in other examples such vehicles may be aircraft, spacecraft, watercraft, and/or the like.

FIG. 1 is a pictorial flow diagram illustrating an example process 100 for modifying received sets of lidar points by clustering based on a range difference threshold. Some or all of the operations in process 100 may be performed by a mirrored object detector 102 configured to receive, analyze, and modify lidar data based on detections of mirrored lidar points. In various examples, the mirrored object detector 102 may be integrated into a lidar device and/or into one or more sensor data analysis components such as a perception component, prediction component, planning component, and/or other components within an autonomous vehicle.

At operation 104, the mirrored object detector 102 may receive first lidar data from a first lidar device and second lidar data from a second lidar device. In some examples, a vehicle may include multiple lidar devices mounted at various locations and various angles relative to the vehicle, to capture lidar data of a driving environment and/or from a single sensor acquired at multiple times. The lidar data may include any number of lidar points representing individual lidar detections from the driving environment. For example, box 106 illustrates an autonomous vehicle 108 navigating a driving environment and capturing lidar data reflected from a plurality of objects. In this example, the autonomous vehicle 108 is approaching a junction including a first object 110, a second object 112, and a third object 114. As shown in box 106, the first object 110 may be a vehicle, the second object 112 may be a vehicle, and the third object 114 may be an overhead road sign mount above (and/or to the side of) the roadway. In other examples, the lidar data captured by a lidar device may include any number of objects, each of which may be any type of dynamic or static object. In other examples, there may be more or less objects at various locations within the environment.

As shown in box 106, the mirrored object detector 102 may receive a first set of lidar points from a first lidar device and a second set of lidar points from a second lidar device. As described above, the autonomous vehicle may have multiple lidar devices configured to capture lidar data of a driving environment. In some examples, a first lidar device on a front left portion of the autonomous vehicle 108 may capture a first set of lidar points, while a second lidar device on a front right portion of the autonomous vehicle 108 may capture a second set of lidar points. However, this is not intended to be limiting, the first lidar device and the second lidar device may be mounted on any surfaces of the autonomous vehicle 108. In any example, data from the various sensors may be transformed into a common reference frame (e.g., body-centric to the vehicle, of the most recently acquired data, of a forwardmost sensor, etc.). The first set of lidar points and the second set of lidar points received by the mirrored object detector 102 may correspond to light pulses that have reflected off one or more of the first object 110, the second object 112, and/or the third object 114. As shown in box 106, the mirrored object detector 102 may receive lidar points (e.g., from the first and second sets) that reflected off the first object 110 and the second object 112.

However, as shown in this example, certain lidar points caused by the reflections of the first object 110, the second object 112, and/or the third object 114 may have inaccurate range values, and thus may be located distant from their respective objects in the top-down representation of the environment. In this example, the lidar points 116 may represent a set of lidar detections based on lidar points which reflected off the third object 114 (e.g., a large sign board) and then reflected a second time off of the first object 110. As a result, the range values for the lidar points 116 are incorrect and separated (e.g., mirrored) from a primary and accurate lidar point cluster of the third object 114. Similarly, lidar points 118 represent another set of lidar detections based on lidar points which reflected off the third object 114 and then reflected again off of the second object 112. As a result, the range values for the lidar points 118 are also inaccurate and separated (e.g., mirrored) from the primary and accurate lidar point cluster of the third object 114. As discussed above, the inaccurate range values of lidar points 116 and lidar points 118 may be caused by the light pulse reflecting off multiple objects within the environment. Specifically, when lidar points 116 are clustered with additional lidar points reflected off of the first object, the lidar points 116 may indicate that the third object 114 has a range consistent with a sum of a distance the light pulse traveled from the third object 114 to the first object 110, and back to the lidar device. Similarly, the clustering of the lidar points 118 with the other lidar points reflected off of the second object 112 may indicate that the third object 114 has range consistent with a sum of a distance the light pulse traveled from the third object 114 to the second object 112, and back to the lidar device.

In some examples, the mirrored object detector 102 may combine lidar points to have a common frame of reference. As described above, the mirrored object detector 102 may receive a first set of lidar points from a first lidar device, and a second set of lidar points from a second lidar device. In some examples, the mirrored object detector 102 may combine the first set of lidar points with the second set of lidar points to a single superset of lidar points. In such examples, the mirrored object detector 102 may determine that the superset of lidar points may include a single frame of reference from a central (e.g., or centroid) location of the vehicle. As discussed above, the single frame of reference may enable the superset of lidar points to view the environment from a same or common perspective.

In some examples, the mirrored object detector 102 may determine a region of overlap between the field of view of the first lidar sensor and the field of view of the second lidar sensor. A region of overlap may be an area of the environment within which the first lidar device and the second lidar device are both capturing lidar data. As described above, the lidar sensors may be mounted at various places on the autonomous vehicle 108. As such, the respective fields-of-view for the lidar devices may be based on the type and location of each lidar device. As shown in box 106, the lidar device on the left may include a field-of-view within the area between the dotted lines emanating from the left corner of the autonomous vehicle 108. Further, the lidar device on the right may include a field-of-view within the area between the dotted lines emanating from the right corner of the autonomous vehicle 108. In some examples, the region of overlap may be the area in front of the vehicle within which the first lidar device and the second lidar device have overlapping fields-of-view. In some examples, the mirrored object detector 102 may determine a subset of lidar points based on the region of overlap. For example, the mirrored object detector 102 may include lidar points of the superset which are from within the region of overlap. In such examples, the mirrored object detector 102 may exclude lidar points of the superset that are outside the region of overlap. As described above, evaluating the lidar points within the region of overlap may reduce the number of lidar points to process, which may reduce the processing load and/or memory overhead required by the autonomous vehicle 108 to analyze the lidar data.

At operation 120, the mirrored object detector 102 may determine a second subset of lidar points from the subset of lidar points based on azimuth data and elevation data. As described above, the mirrored object detector 102 may determine (e.g., cluster) a second subset of lidar points by clustering the lidar points of the subset based on elevation data and azimuth data. For example, box 122 illustrates a representation of lidar points 124 clustered based on elevation data and azimuth data. The clustered lidar points shown in box 122 may correspond to the same or similar lidar data of the environment shown in box 106. Further, the object shown in box 122 may correspond to a back portion of the first object 110 in box 106. In this example, the mirrored object detector 102 may use a clustering algorithm to cluster the subset of lidar points received in operation 104, based on the azimuth values and elevation values of the lidar points of the subset.

As shown in this example, the mirrored object detector 102 has determined a second subset of lidar points 124. As shown, the second subset of lidar points 124 may be illustrated using a grid system based on elevation data and azimuth data. In such examples, each cell in the grid may represent a particular azimuth value (or range) and a particular elevation value (or range) of the second subset of lidar points. Further, the box 122 illustrates a location in which the lidar points 124 reflected off the first object 110 (e.g., based on the lidar point elevation and azimuth values). In some examples, each elevation and azimuth value (e.g., represented as a single cell in the grid) may include two lidar points, one lidar point from the first lidar device and another lidar point from the second lidar device. However, this example is not intended to be limiting, the second subset of lidar points may include more or less lidar points. Further, the lidar points 124 may correspond to a same or different lidar device. In some examples, the mirrored object detector 102 may evaluate the lidar points at each azimuth and elevation (e.g., a single cell) based on the range values of the lidar points.

At operation 126, the mirrored object detector 102 may compare a first range of a first lidar point to a second range of a second lidar point. As described above, the mirrored object detector 102 may evaluate the lidar points within all, or some, of the cells in the azimuth/elevation grids. Based on identifying two lidar points at a particular azimuth and elevation (e.g., within a cell), the mirrored object detector 102 may compare the ranges of such lidar points. For example, box 128 illustrates a graph of two lidar points based on range data. In this example, the mirrored object detector 102 may compare a first range 130 of the first lidar point to the second range 132 of the second lidar point. In some examples, the first range 130 is shown at a range of around 45 meters. Further, the second range 132 is shown at a range of around 90 meters.

In some examples, the mirrored object detector 102 may compare a range difference with a range difference threshold. The mirrored object detector 102 may determine a range difference based on comparing (e.g., subtracting) the first range 130 to the second range 132. In this example, the mirrored object detector 102 may determine that the range difference between the first range 130 and the second range 132 is 45 meters. Based on determining the range difference is 45 meters, the mirrored object detector 102 may compare the range difference to a pre-determined range difference threshold. In some examples, the range difference threshold may represent a threshold above which the mirrored object detector 102 may determine that the lidar point is a mirrored lidar point. The range difference threshold may be determined based on a type of detected object, distance to the detected object, vehicle 108 pose, object pose, etc. In some examples, the mirrored object detector 102 may determine that the range difference exceeds the range difference threshold, thereby indicating that the second lidar point is a mirrored lidar point.

At operation 134, the mirrored object detector may modify the second subset of lidar points determined at operation 120, based at least in part on determining that a range difference for two lidar points at a same azimuth and elevation exceed a range difference threshold in operation 126. In some examples, the mirrored object detector 102 may modify the second subset of lidar points my removing or modifying the lidar point which is identified as a mirrored lidar point. For instance, box 136 illustrates an example in which the mirrored object detector 102 has modified the second subset of lidar points 124 which were identified in operation 126 as being a mirrored lidar point. In this example, the mirrored object detector 102 may remove the lidar points 116 and the lidar points 118. As shown in box 136, the second subset of lidar points have been modified to remove the lidar points 116 and lidar points 118 from the driving environment. Additionally or alternatively, the mirrored object detector 102 may modify the second subset of lidar points by assigning a low confidence level to the second lidar point.

The lidar points, such as lidar points 116 and lidar points 118, may be referred to as mirrored lidar points because they may represent lidar points mirroring the third object 114 at the azimuth of the first object 110 or the second object 112.

Figure 2:
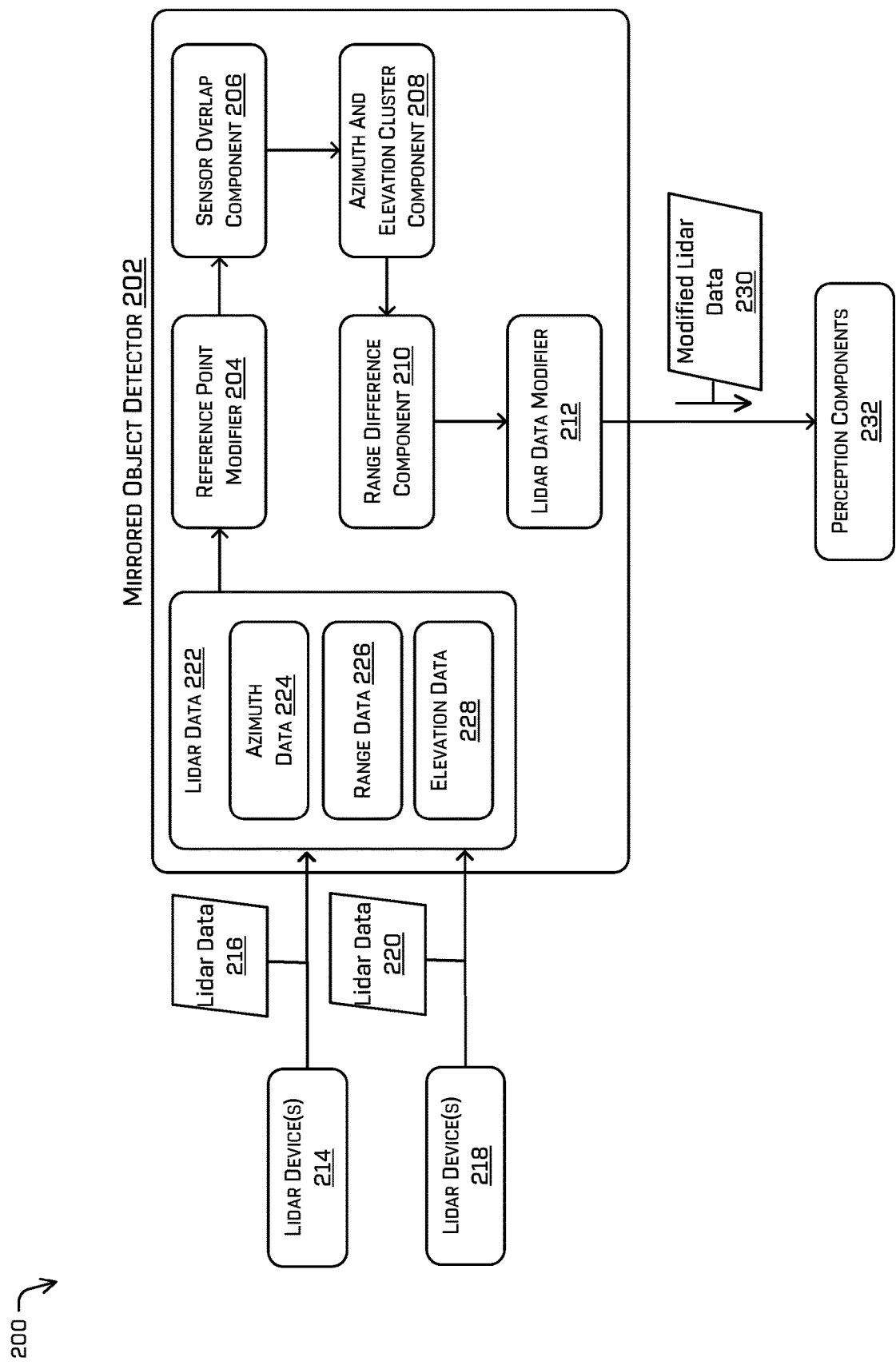
FIG. 2 illustrates an example computing system including a mirrored object detector to modify lidar data based on detected mirror lidar points, in accordance with one or more examples of the disclosure.

FIG. 2 illustrates an example computing system including a mirrored object detector 202 configured to modify lidar data based on detected mirror lidar points.

In some examples, the mirrored object detector 202 may be similar or identical to the mirrored object detector 102 described above, or in any other examples herein. As noted above, in some cases the mirrored object detector 202 may be implemented within or otherwise associated with a perception component, prediction component, and/or planning component of an autonomous vehicle. In some examples, the mirrored object detector 202 may include various components described below, configured to perform different functionalities of a clustering technique for analyzing and modifying lidar data. For instance, the mirrored object detector 202 may include a reference point modifier 204 configured to modify lidar data to include a common frame of reference from a central location of the vehicle. The mirrored object detector 202 may also include a sensor overlap component 206 configured to modify lidar data based on determining a region of overlap, an azimuth and elevation cluster component 208 configured to determine a subset of lidar data based on clustering the lidar points based on elevation data and azimuth data, a range difference component 210 configured to compare the range values of multiple lidar points, and a lidar data modifier 212 configured to modify the subset of lidar points.

In some examples, the mirrored object detector 202 may receive lidar data from one or more lidar device(s) within (or otherwise associated with) an autonomous vehicle. Different lidar device(s) may be mounted or installed at different locations on the autonomous vehicle, and may include various types of lidar devices providing various elements (or parameters) of lidar data to the mirrored object detector 202. As shown in FIG. 2, a first lidar device 214 may provide first lidar data 216 to the mirrored object detector 202. Further, a second lidar device 218 may provide second lidar data 220 to the mirrored object detector 202. In some examples, the first lidar device 214 and the second lidar device 218 may each capture unique lidar data based on the location and/or type of the lidar device. As shown in this example, the mirrored object detector 202 may include a lidar data component 222 configured to receive, store, and/or synchronize lidar data from the first lidar device 214 and the second lidar device 218 (e.g., and any additional lidar devices). The lidar data component 222 may include various subcomponents, described below, to receive, store, synchronize, and/or analyze the first lidar data 216 and the second lidar data 220. A lidar device may capture any number of parameters of lidar data component 222 from any number of lidar devices. As shown in FIG. 2, the illustrated subcomponents are some of the possible lidar data parameters that a lidar device may capture. In some examples, a lidar device may capture more or less than the illustrated lidar data components shown in FIG. 2.

In this example, the lidar data component 222 may include one or more subcomponents associated with different lidar data components (or parameters). As illustrated in FIG. 2, the first lidar device 214 may capture first lidar data 216 and the second lidar device 218 may capture second lidar data 220, including an azimuth data component 224, range data component 226, and elevation data component 228. In some examples, depending on the type of lidar device, the first lidar device 214 and the second lidar device 218 may capture additional or fewer lidar data parameters. In this example, azimuth data component 224 may be used to determine, store, and/or synchronize a direction (or bearing) of detected objects relative to the lidar device(s). The range data component 226 may be used to receive, store, and/or synchronize the distance of detected objects relative to the lidar device(s). The elevation data component 228 may be used to determine, store, and/or synchronize the height of detected objects based on the first lidar data 216 and the second lidar data 220.

In some examples, the mirrored object detector 202 may include a reference point modifier 204 configured to modify lidar data to include a common frame of reference from a central location of the vehicle. The reference point modifier 204 may receive a set of lidar points including one or more lidar data parameters (e.g., subcomponents) from the lidar data component 222. In some examples, the reference point modifier 204 may combine the first lidar data 216 and the second lidar data 220. In such examples, the reference point modifier 204 may combine the first lidar data 216 and the second lidar data 220 into a single superset. In some examples, the superset of lidar data may have a common frame of reference from a central (e.g., or centroid) location of the vehicle. Accordingly, the superset of lidar data may include the first lidar data 216 from the first lidar device 214, and the second lidar data 220 from the second lidar device 218.

In some examples, the mirrored object detector 202 may include a sensor overlap component 206 configured to modify lidar data based on determining a region of overlap. The sensor overlap component 206 may determine a region of overlap which is encompassed by an overlapping field-of-view of the first lidar device 214 and the second lidar device 218. In some examples, the sensor overlap component 206 may receive the superset of lidar data from the reference point modifier 204. Based on determining the region of overlap, the sensor overlap component 206 may modify the superset of lidar data to exclude the lidar data that does not include lidar detections within the region of overlap. In such examples, the modified superset of lidar data may include the lidar data with lidar detections from within the region of overlap.

In some examples, the mirrored object detector 202 may include an azimuth and elevation cluster component 208 configured to determine a subset of lidar data based on clustering the superset of lidar points based on elevation data and azimuth data. The azimuth and elevation cluster component 208 may receive the modified superset of lidar data from the sensor overlap component 206. In some examples, the azimuth and elevation cluster component 208 may use various clustering algorithms to determine a second subset of lidar data from the modified superset of lidar data. In such examples, the azimuth and elevation cluster component 208 may cluster the modified superset of lidar points based on azimuth data component 224 and range data component 230. In yet other examples, the elevation cluster component 208 may be configured to cluster the first lidar data 216 and the second lidar data 220 prior to modifying the lidar data based on a region of overlap.

In some examples, the mirrored object detector 202 may include a range difference component 210 configured to compare the range values of multiple lidar points. The range difference component 210 may receive the second subset of lidar data from the azimuth and elevation cluster component 208. In some examples, the range difference component 210 may identify lidar points of the second subset at a particular azimuth and elevation and compare the range data of the lidar points. In such examples, the range difference component 210 may evaluate all, or some, azimuth and elevation combinations. The range difference component 210 may identify two or more lidar points at a particular azimuth and elevation (e.g., one lidar point for each lidar device). In some examples, the range difference component 210 may determine a range difference by comparing a first range of a first lidar point with a second range of a second lidar point. In such examples, comparing the ranges may include subtracting one range from another range. Based on determining a range difference, the range difference component 210 may compare the range difference to a range difference threshold. The range difference threshold may indicate a threshold above which a lidar point may be identified as a mirrored lidar point. The range difference threshold may be predetermined, or may be determined based on machine-learned models and/or heuristics. In some examples, the range difference threshold may be determined based on a type of detected object, distance to the detected object, vehicle 104 pose, object pose, etc.). In some examples, based on the range difference exceeding the range difference threshold, the range difference component 210 may identify the lidar point with the larger range as a mirrored lidar point.

In some examples, the mirrored object detector 202 may include a lidar data modifier 212 configured to modify the subset of lidar points. The lidar data modifier 212 may receive a subset of lidar points (e.g., the second subset) including any mirrored lidar points. In such examples, the lidar data modifier 212 may modify the second subset of lidar points in a variety of ways. For instance, the lidar data modifier 212 may modify the individual lidar points by assigning a lower confidence level to the mirrored lidar point, removing the mirrored lidar point from the second subset of lidar points, and/or any other modifying action.

As shown in this example, the lidar data modifier 212 may send the modified sensor data 230 to perception components 232 for further processing. In such examples, based on the lidar data modifier 212 having modified the second subset of lidar points, the lidar data modifier 212 may send the modified sensor data 230 to the perception components 232.

Figure 3:
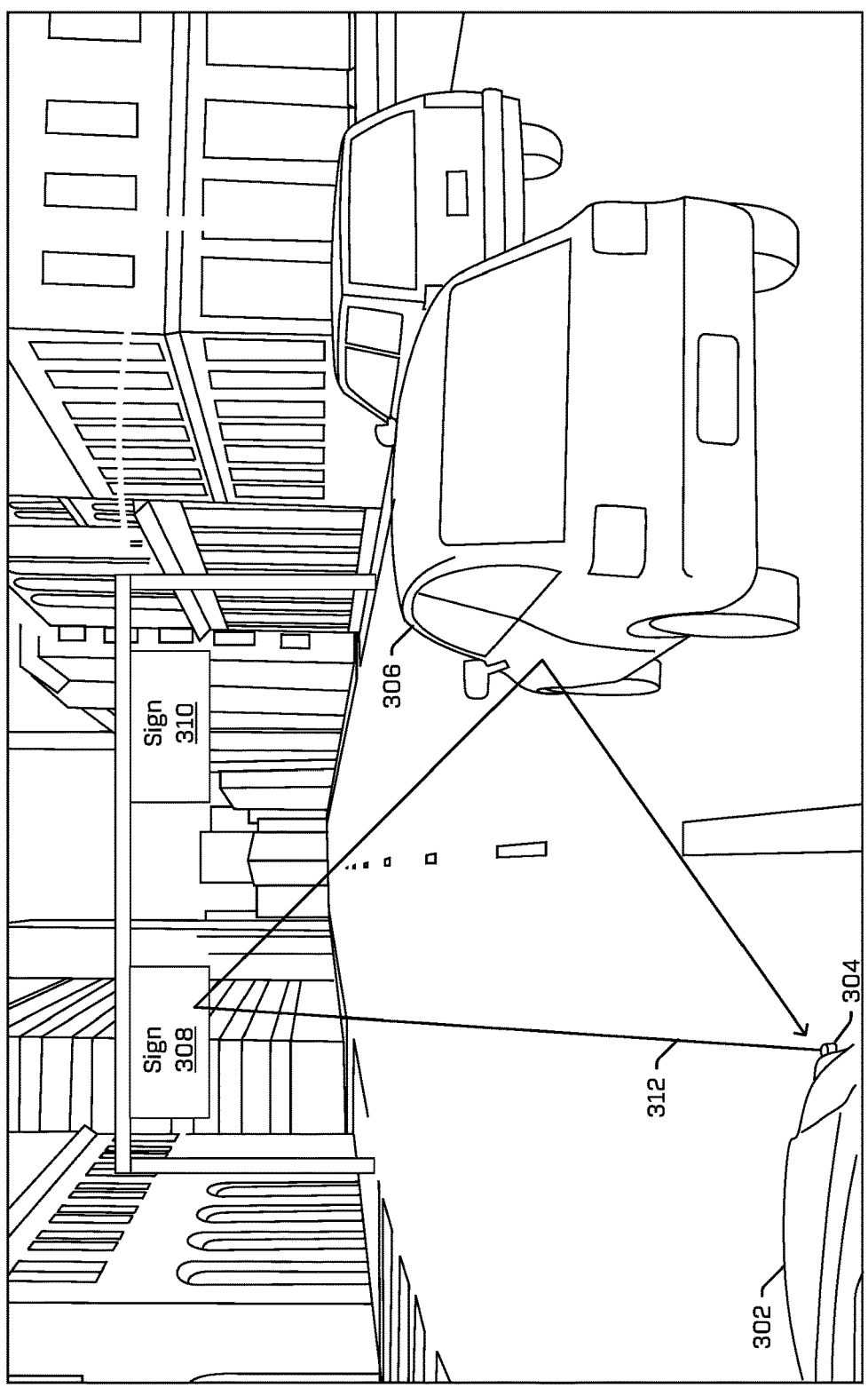
FIG. 3 depicts an example environment of a vehicle utilizing lidar devices to capture lidar data, in accordance with one or more examples of the disclosure.

FIG. 3 depicts an example environment 300 of a vehicle 302 utilizing lidar devices to capture lidar data.

In some examples, the example environment 300 may include a number of objects. In such examples, the example environment 300 may include a vehicle 302. The vehicle 302 may include a lidar device 304 configured to capture lidar data of the example environment 300. The lidar device 304 may emit light pulses which reflect off surfaces within the example environment 300 and return to the lidar device

304. In some examples, the lidar device 304 may be used to determine a distance from the lidar device 304 to objects within the example environment 300. In some examples, the example environment may also include a first object 306, a first sign 308, and a second sign 310. As shown, the first object 306 may be a vehicle. However, in other examples the first object 306 may be any other static or dynamic object. In some examples, the first sign 308 and the second sign 310 may be large signs that are proximate the roadway. Though shown in FIG. 3 as spanning the roadway, in other examples the signs may be on a side portion of the roadway. In this example, the vehicle 302 and the first object 306 may be approaching the first sign 308 and the second sign 310.

In some examples, the lidar device 304 may emit a light pulse 312 within the example environment 300. As shown, the light pulse 312 may reflect off multiple objects within the example environment 300. In this example, the light pulse 312 may travel to and reflect off the first sign 308. After reflecting off the first sign 308, the light pulse 312 may reflect off a side portion of the first object 306 before returning to the lidar device 304. In some examples, the vehicle 302 may analyze lidar data associated with the light pulse 312. In such examples, the lidar data associated with the light pulse 312 may indicate that the detected object has an azimuth value corresponding to the first object 306, while indicating that the detected object has a range value (e.g., distance from the lidar device 304) corresponding to the sum of the distance the light pulse 312 traveled from the first sign 308 to the first object 306, and back to the lidar device 304. Accordingly, the vehicle 302 may determine that the lidar data associated with the light pulse 312 may indicate the presence of a detected object which is occluded by the first object 306.

Figure 4:
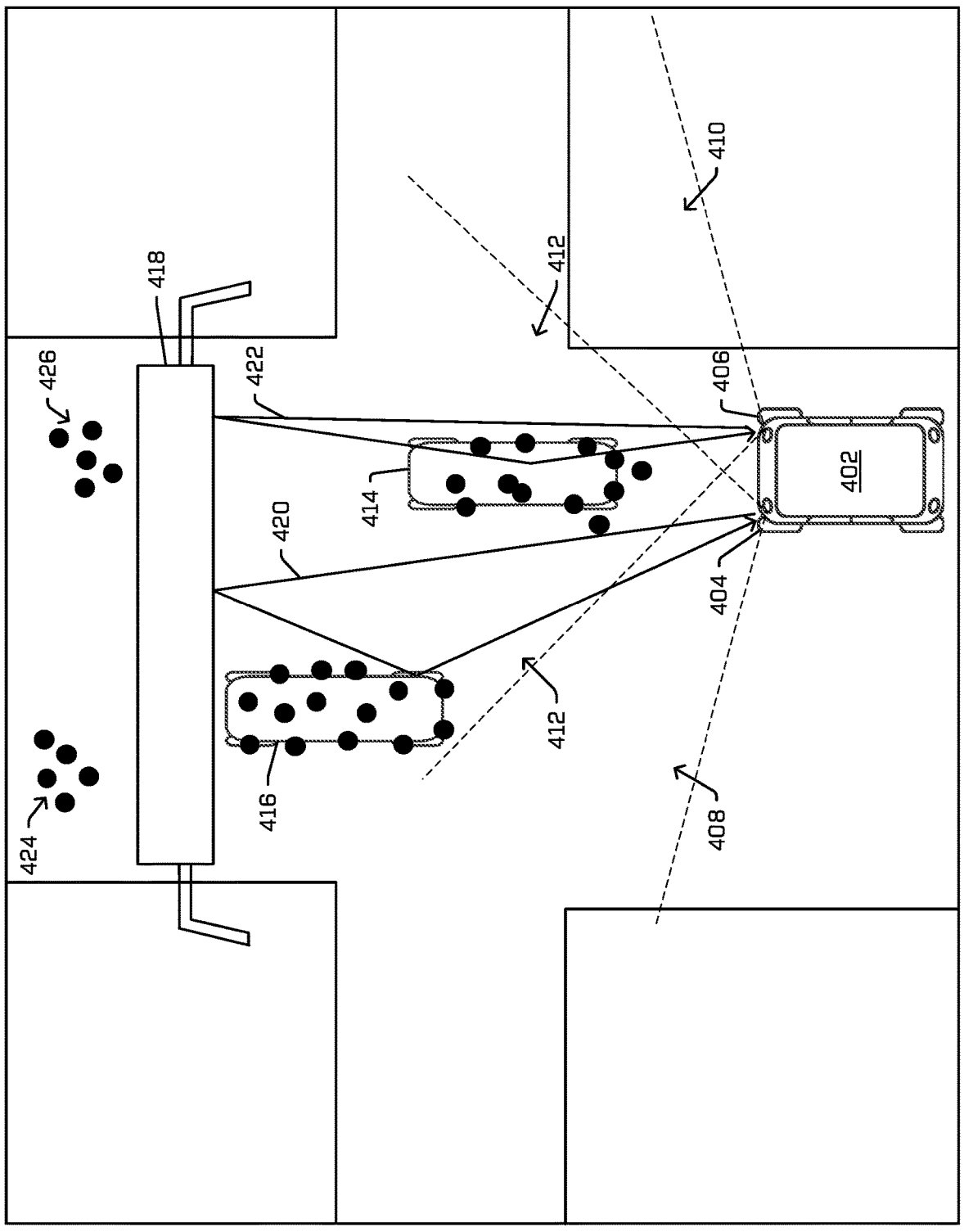
FIG. 4 depicts an example environment of a vehicle approaching a junction including objects, in accordance with one or more examples of the disclosure.

FIG. 4 depicts an example environment 400 of a vehicle 402 approaching a junction including objects.

In some examples, the example environment 400 may be similar or identical to the environment of FIG. 1. As described above, the example environment 400 may include a number of objects navigating through a junction. In some examples, the example environment 400 may include a vehicle 402. In some examples, the vehicle 402 may include multiple lidar devices configured to capture lidar data as the vehicle 402 operates within the example environment 400. As shown in the example environment 400, the vehicle 402 may include a first lidar device 404 and a second lidar device 406. In some examples, the first lidar device 404 of the vehicle 402 may include a first field-of-view 408 (e.g., area in which the first lidar device 404 may capture lidar data). Further, the second lidar device 406 of the vehicle 402 may include a second field-of-view 410. In some examples, the first lidar device 404 and the second lidar device 406 may have a region of overlap 412 which is within the field-of-view for both lidar devices.

In some examples, the example environment 400 may include a first object 414, a second object 416, and a third object 418. As shown, the first object 414 and the second object 416 may be a vehicle. Further, the first object 414 and the second object 416 may be traversing the example environment 400 in a similar direction as the vehicle 402. In some examples, the third object 418 may be a static object, such as an overhead sign. However, in other examples the third object 418 may be a bridge, building, etc. In some examples, the first object 414, the second object 416, and the third object 418 may be within the region of overlap 412.

In some examples, the vehicle 402 may emit a number of lidar light pulses throughout the example environment 400. In such examples, the first lidar device 404 of the vehicle 402 may emit a first light pulse 420. The first light pulse 420 may travel and reflect off the third object 418 and while returning to the first lidar device 404, the first light pulse 420 may also reflect off a side portion of the second object 416. Due to the first light pulse 420 reflecting from multiple objects within the example environment, the vehicle 402 may determine that the lidar data of the first light pulse 420 may be inaccurate. In such examples, the lidar data of the first light pulse 420 may have an azimuth value corresponding to the second object 416, but have a range value corresponding to a distance beyond the third object 418. Based on the inaccurate range data of the first light pulse 420, the first light pulse 420 may be associated with a first mirrored lidar cluster 424. The first mirrored lidar cluster 424 may include a number of lidar points which have a similar azimuth value as the second object 416. In some examples, the second lidar device 406 of the vehicle 402 may emit a second light pulse 422 which may travel and reflect off the third object 418, and while returning to the second lidar device 406, the second light pulse 422 may also reflect off a top portion of the first object 414. Due to the second light pulse 422 reflecting from multiple objects within the example environment, the vehicle 402 may determine that the lidar data of the second light pulse 422 may be inaccurate. In such examples, the lidar data of the second light pulse 422 may have an azimuth value consistent with the first object 414, but have a range value corresponding to a distance beyond the third object 418. Based on the inaccurate range data of the second light pulse 422, the second light pulse 422 may be associated with a second mirrored lidar cluster 426. The second mirrored lidar cluster 426 may include a number of lidar points which have a similar azimuth value of the first object 414, and a similar range value of the third object 418.

Figure 5:
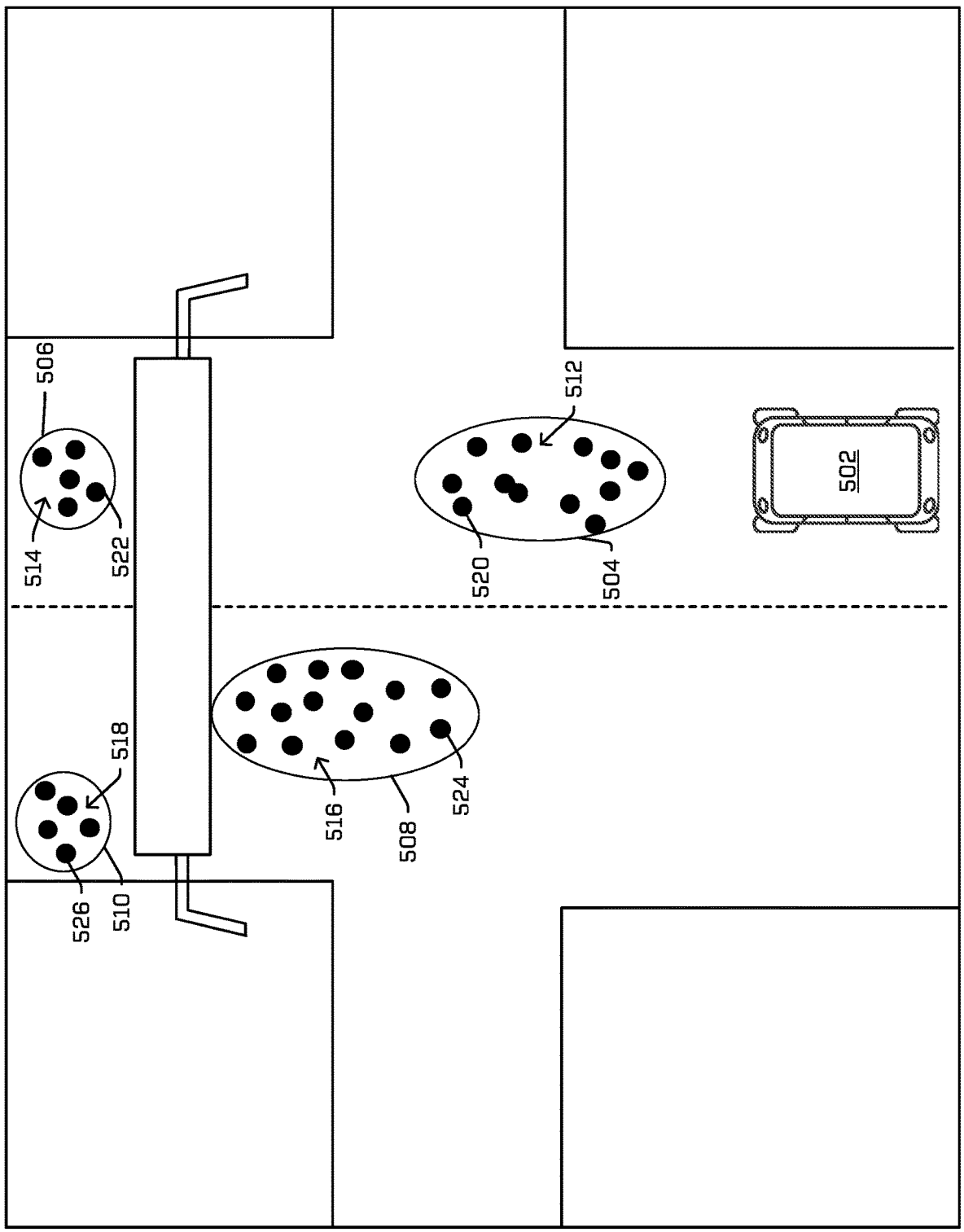
FIG. 5 depicts an example environment of a vehicle approaching a junction including detected objects, in accordance with one or more examples of the disclosure.

FIG. 5 depicts an example environment 500 of a vehicle 502 approaching a junction including detected objects. In addition to detecting mirrored lidar points based on range data, the vehicle may also detect mirrored objects based on determining whether lidar points are associated with a same or different detected object.

In some examples, the example environment 500 may include a vehicle 502. As described above, the vehicle 502 may have a number of lidar devices configured to capture lidar data of the example environment 500. In some examples, the example environment 500 may also include a number of detected objects. In such examples, the example environment 500 may include a first detected object 504, a second detected object 506, a third detected object 508, and a fourth detected object 510. The detected objects may include numerous lidar points. In such examples, the first detected object 504 may include a first set of lidar points 512, the second detected object 506 may include a second set of lidar points 514, the third detected object 508 may include a third set of lidar points 516, and the fourth detected object 510 may include a fourth set of lidar points 518. In some examples, the vehicle may determine or generate detected objects based on performing clustering algorithms and/or techniques. In some examples, the clustering algorithms and/or techniques may include determining that a number of lidar points are within a threshold range and/or azimuth from one lidar point to another. Further, such algorithms and/or techniques may include clustering based on range and/or azimuth values.

As described above, the vehicle may determine a subset of lidar points based on elevation and azimuth data. In such examples, the vehicle 502 may identify a first lidar point 520 and a second lidar point 522 at a particular elevation and azimuth value. The vehicle 502 may determine whether the first lidar point 520 and the second lidar point 522 are associated with the same detected object. As shown, the first lidar point 520 is associated with the first detected object 504 and the associating first set of lidar points 512. Further, the second lidar point 522 is associated with the second detected object 506 and the associating second set of lidar points 514. In such examples, the vehicle 502 may determine that the first lidar point 520 and the second lidar point 522 are associated with different detected objects. In such examples, the vehicle 502 may identify the lidar point (e.g., from the first lidar point and the second lidar point) with the larger range value. Based on the second lidar point 522 having a larger range value, the vehicle 502 may identify the second lidar point 522 and/or the second detected object 506 as mirrored lidar points/objects. In such examples, the vehicle may modify the second subset as described above.

Further, the vehicle may identify a third lidar point 524 and a fourth lidar point 526 at a second elevation and second azimuth value. The vehicle 502 may determine whether the third lidar point 524 and the fourth lidar point 526 are associated with the same detected object. As shown, the third lidar point 524 is associated with the third detected object 508 with the associating third sent of lidar points. Further, the fourth lidar point 526 is associated with the fourth detected object 510 and the associating fourth set of lidar points 518. In such examples, the vehicle 502 may determine that the third lidar point 524 and the fourth lidar point 526 are associated with different detected objects. In such examples, the vehicle 502 may identify the lidar point (e.g., from the third lidar point and the fourth lidar point) with the larger range value. Based on the fourth lidar point 526 having a larger range value, the vehicle 502 may identify the fourth lidar point 526 and/or the third detected object 508 as mirrored lidar points/objects. In such examples, the vehicle may modify the second subset as described above.

As described in FIG. 5, such techniques may be an improvement as it allows the vehicle 502 to more accurately identify mirrored lidar points. In some examples, the techniques in this solution assist in identifying mirrored lidar points by creating detected objects based on a number of lidar points within a densely packed range and/or azimuth. When comparing a first lidar point with a second lidar point, the vehicle may determine whether the first lidar point and the second lidar point are associated with the same detected object.

Figure 6:
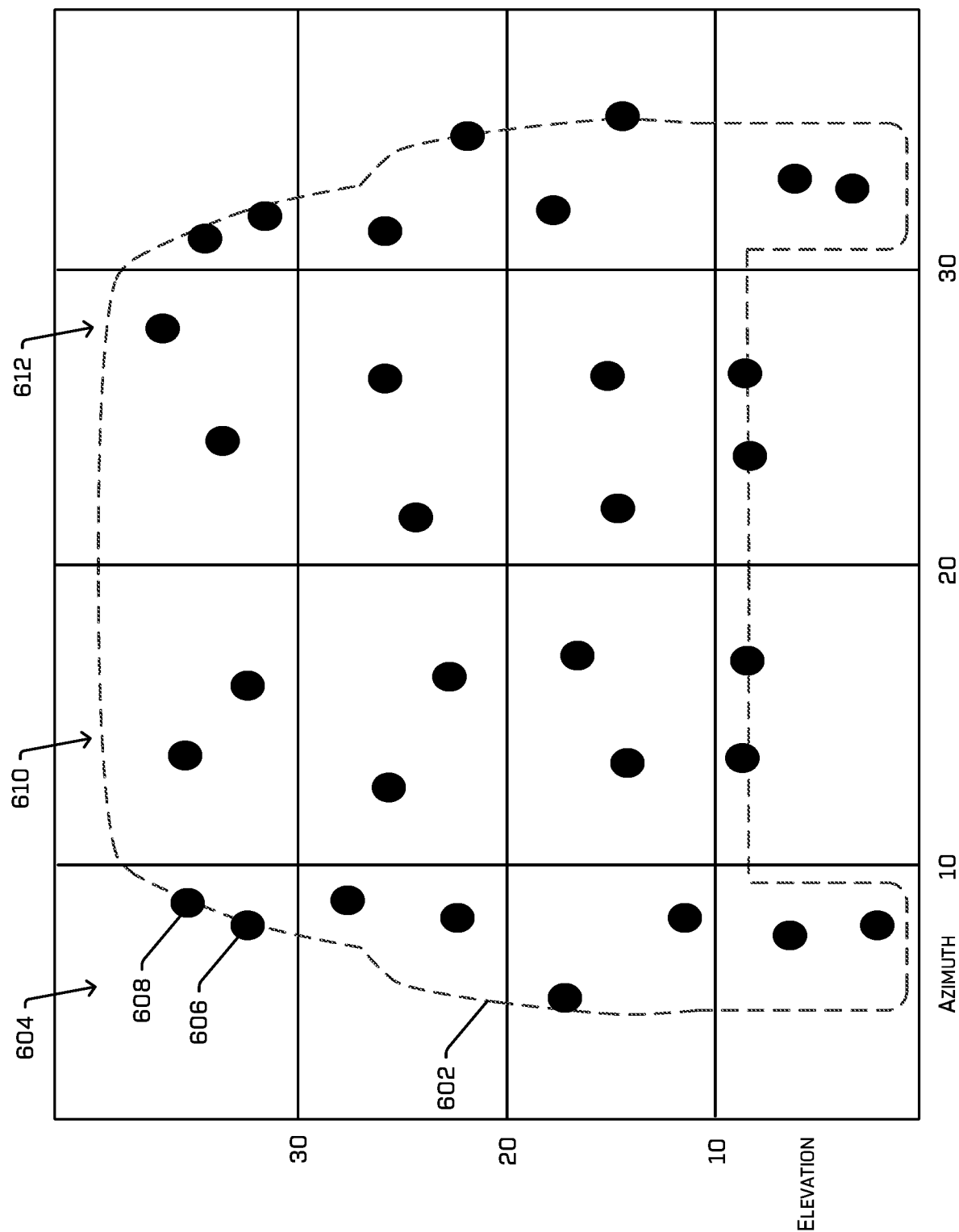
FIG. 6 depicts an example graph of lidar points clustered based on azimuth data and elevation data, in accordance with one or more examples of the disclosure.

FIG. 6 depicts an example graph 600 of lidar points clustered based on azimuth data and elevation data.

In some examples, the example graph 600 may be similar or identical to the graph of FIG. 1. As described above, the example graph 600 may include an object 602. In some examples, the object 602 may be similar or identical to the first object 110 of FIG. 1. In such examples, the example graph 600 may illustrate a back portion of the object 602. The example graph 600 may also include a set of lidar points (e.g., the lidar points within the example graph 600) that have been clustered based on azimuth data and elevation data. In some examples, the example graph 600 may illustrate a location (e.g., azimuth/elevation coordinate) on the object 602 off of which the lidar points reflected. The example graph 600 may also include a graph or grid-like system configured to illustrate particular azimuth and elevation values. The grid-like system may include a number of cells which may include two or more lidar points. In some examples, the cells may include one or more lidar points from a first lidar device and a second lidar device. In other examples, cells may include three or more lidar points due to multipath lidar returns. It is to be understood that the example graph 600 may include any number of cells based on a number of factors (e.g., object distance from sensor, sensor type, etc.).

In some examples, the mirrored object detector 102 may compare range values of the lidar points within all, or some, of the cells. As described above, the example graph 600 may include a grid-like system which may include a number of cells having numerous lidar points. In some examples, the mirrored object detector 102 may evaluate the lidar points within a first cell 604. The first cell 604 may include a first lidar point 606 and a second lidar point 608. In some examples, the first lidar point 606 and the second lidar point 608 may be evaluated together based on the two lidar points at a similar azimuth and elevation (e.g., within a same cell). In some examples, the first lidar point 606 may be a lidar return from a first lidar device, and the second lidar point 608 may be a lidar return from a second lidar device. In other examples, the first lidar point 606 and the second lidar point 608 may be lidar returns from a single lidar device. In some examples, the mirrored object detector 102 may compare a first range value of the first lidar point 606 with a second range value of the second lidar point 608. The mirrored object detector 102 may compare a difference of the first range and the second range to a range difference threshold. Such a comparison may indicate whether one of the lidar points is a mirrored lidar point. In some examples, the mirrored object detector 102 may perform similar functions for the lidar points in cell 610, cell 612, and any other cell of the example graph 600.

Figure 7:
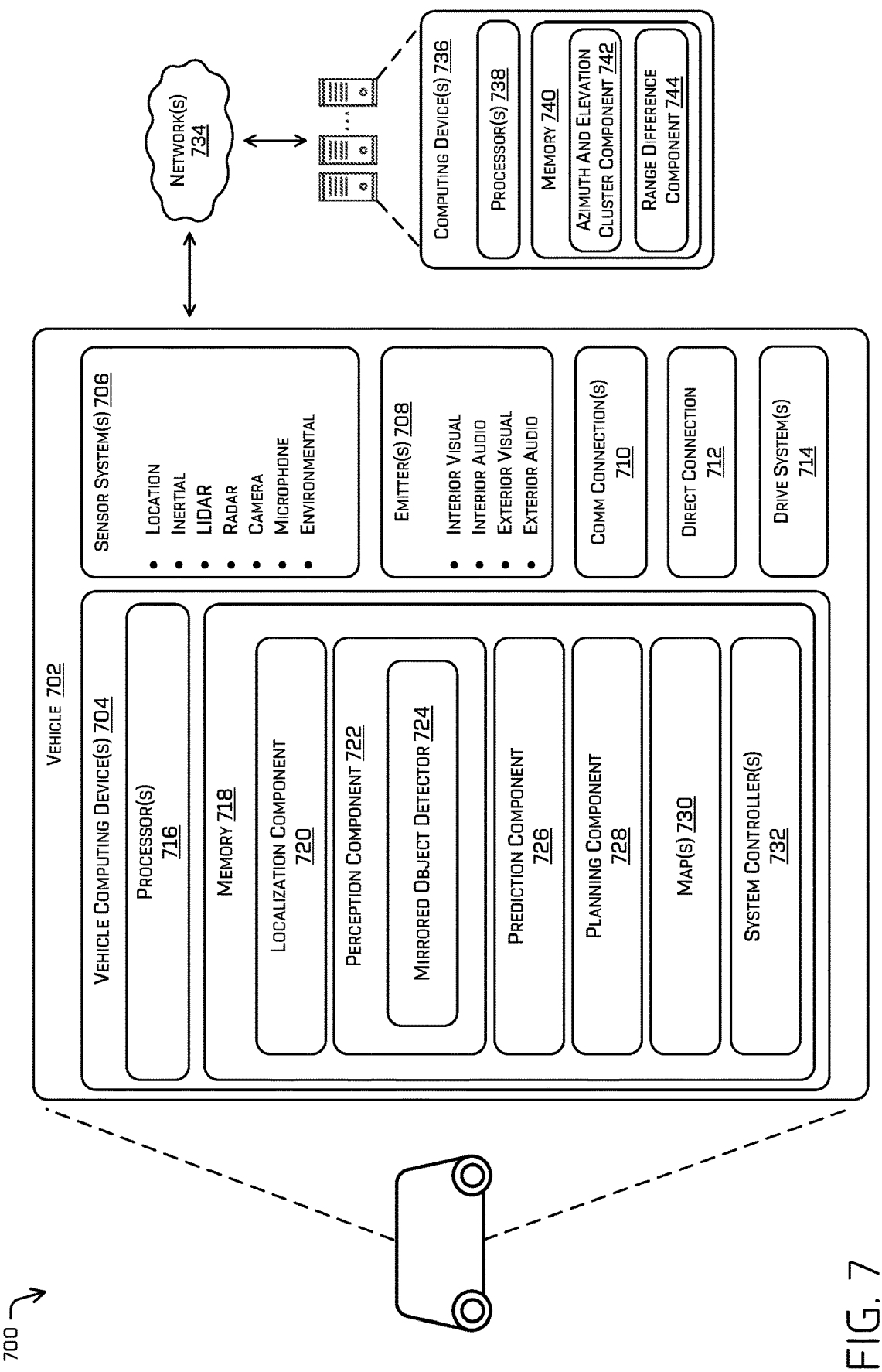
FIG. 7 is a block diagram of an example system for implementing the techniques described herein.

FIG. 7 is a block diagram of an example system 700 for implementing the techniques described herein. In at least one example, the system 700 may include a vehicle, such as vehicle 702. The vehicle 702 may include one or more vehicle computing devices 704, one or more sensor systems 706, one or more emitters 708, one or more communication connections 710, at least one direct connection 712, and one or more drive systems 714.

The vehicle computing device 704 may include one or more processors 716 and memory 718 communicatively coupled with the processor(s) 716. In the illustrated example, the vehicle 702 is an autonomous vehicle; however, the vehicle 702 could be any other type of vehicle, such as a semi-autonomous vehicle, or any other system having at least an image capture device (e.g., a camera-enabled smartphone). In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In the illustrated example, the memory 718 of the vehicle computing device 704 stores a localization component 720, a perception component 722 including a mirrored object detector 724, a prediction component 726, a planner component 728, one or more system controllers 732, and one or more maps 730 (or map data 730). Though depicted in FIG. 7 as residing in the memory 718 for illustrative purposes, it is contemplated that the localization component 720, the perception component 722 including the one or more mirrored object detector 724, the prediction component 726, the planner component 728, system controller(s) 732, and/or the map(s) may additionally, or alternatively, be accessible to the vehicle 702 (e.g., stored on, or otherwise accessible by, memory remote from the vehicle 702, such as, for example, on memory 740 of one or more computing device 736). In some examples, the memory 740 may include an azimuth and elevation cluster component 742 and a range difference component 744.

In at least one example, the localization component 720 may include functionality to receive sensor data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 730, and may continuously determine a location and/or orientation of the vehicle 702 within the environment. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 702. In some instances, the localization component 720 may provide data to various components of the vehicle 702 to determine an initial position of the vehicle 702 for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The mirrored object detector 724 may be perform any of the techniques described with respect to any of FIGS. 1-6 above with respect to determining mirrored lidar points, and modifying and/or disregarding such mirrored lidar points for subsequent processing.

The prediction component 726 may generate one or more probability maps representing prediction probabilities of possible locations of one or more objects in an environment. For example, the prediction component 726 may generate one or more probability maps for vehicles, pedestrians, animals, and the like within a threshold distance from the vehicle 702. In some instances, the prediction component 726 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 726 may generate predicted trajectories of objects (e.g., objects) in an environment. For example, the prediction component 726 may generate one or more predicted trajectories for objects within a threshold distance from the vehicle 702. In some examples, the prediction component 726 may measure a trace of an object and generate a trajectory for the object based on observed and predicted behavior.

In general, the planner component 728 may determine a path for the vehicle 702 to follow to traverse through an environment. For example, the planner component 728 may determine various routes and trajectories and various levels of detail. For example, the planner component 728 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 728 may generate an instruction for guiding the vehicle 702 along at least a portion of the route from the first location to the second location. In at least one example, the planner component 728 may determine how to guide the vehicle 702 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 728 may select a trajectory for the vehicle 702.

In other examples, the planner component 728 may alternatively, or additionally, use data from the localization component 720, the perception component 722, and/or the prediction component 726 to determine a path for the vehicle 702 to follow to traverse through an environment. For example, the planner component 728 may receive data (e.g., object data) from the localization component 720, the perception component 722, and/or the prediction component 726 regarding objects associated with an environment. In some examples, the planner component 728 receives data for relevant objects within the environment. Using this data, the planner component 728 may determine a route to travel from a first location (e.g., a current location) to a second location (e.g., a target location) to avoid objects in an environment. In at least some examples, such a planner component 728 may determine there is no such collision-free path and, in turn, provide a path that brings vehicle 702 to a safe stop avoiding all collisions and/or otherwise mitigating damage.

In at least one example, the vehicle computing device 704 may include one or more system controllers 732, which may be configured to control steering, propulsion, braking, safety, emitters, communication, and other systems of the vehicle 702. The system controller(s) 732 may communicate with and/or control corresponding systems of the drive system(s) 714 and/or other components of the vehicle 702.

The memory 718 may further include one or more maps 730 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 730. That is, the map(s) 730 may be used in connection with the localization component 720, the perception component 722, the prediction component 726, and/or the planner component 728 to determine a location of the vehicle 702, detect objects in an environment, generate routes, determine actions and/or trajectories to navigate within an environment.

In some examples, the one or more maps 730 may be stored on a remote computing device(s) (such as the computing device(s) 736) accessible via network(s) 734. In some examples, multiple maps 730 may be stored based on, for example, a characteristic (e.g., type of entity, time of day, day of week, season of the year, etc.). Storing multiple maps 730 may have similar memory requirements, but increase the speed at which data in a map may be accessed.

In some instances, aspects of some or all of the components discussed herein may include any models, techniques, and/or machine-learned techniques. For example, in some instances, the components in the memory 718 (and the memory 740, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or in the alternative, the sensor system(s) 706 may send sensor data, via the one or more networks 734, to the one or more computing device(s) 736 at a particular frequency, after a lapse of a predetermined period of time, in near real-time, etc.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connections 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 710 may allow the vehicle to communicate with other nearby computing device(s) (e.g., computing device 736, other nearby vehicles, etc.) and/or one or more remote sensor system(s) for receiving sensor data. The communications connection(s) 710 also enable the vehicle 702 to communicate with a remote teleoperations computing device or other remote services.

The communications connection(s) 710 may include physical and/or logical interfaces for connecting the vehicle computing device 704 to another computing device or a network, such as network(s) 734. For example, the communications connection(s) 710 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the mirrored object detector 724, the prediction component 726, the planner component 728, the one or more system controllers 732, and the one or more maps 730 may process sensor data, as described above, and may send their respective outputs, over the one or more network(s) 734, to the computing device(s) 736. In at least one example, the localization component 720, the perception component 722, the mirrored object detector 724, the prediction component 726, the planner component 728, the one or more system controllers 732, and the one or more maps 730 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 734. In some examples, the vehicle 702 may receive sensor data from the computing device(s) 736 and/or remote sensor system(s) via the network(s) 734. The sensor data may include raw sensor data and/or processed sensor data and/or representations of sensor data. In some examples, the sensor data (raw or processed) may be sent and/or received as one or more log files.

The computing device(s) 736 may include processor(s) 738 and a memory 740, which may include an azimuth and elevation cluster component 742 and an range difference component 744. In some examples, the memory 740 may store one or more of components that are similar to the component(s) stored in the memory 718 of the vehicle 702. In such examples, the computing device(s) 736 may be configured to perform one or more of the processes described herein with respect to the vehicle 702. In some examples, the azimuth and elevation cluster component 742 and an range difference component 744 may perform substantially similar functions as the mirrored object detector 724.

The processor(s) 716 of the vehicle 702 and the processor(s) 738 of the computing device(s) 736 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 740 are examples of non-transitory computer-readable media. The memory 718 and memory 740 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 8:
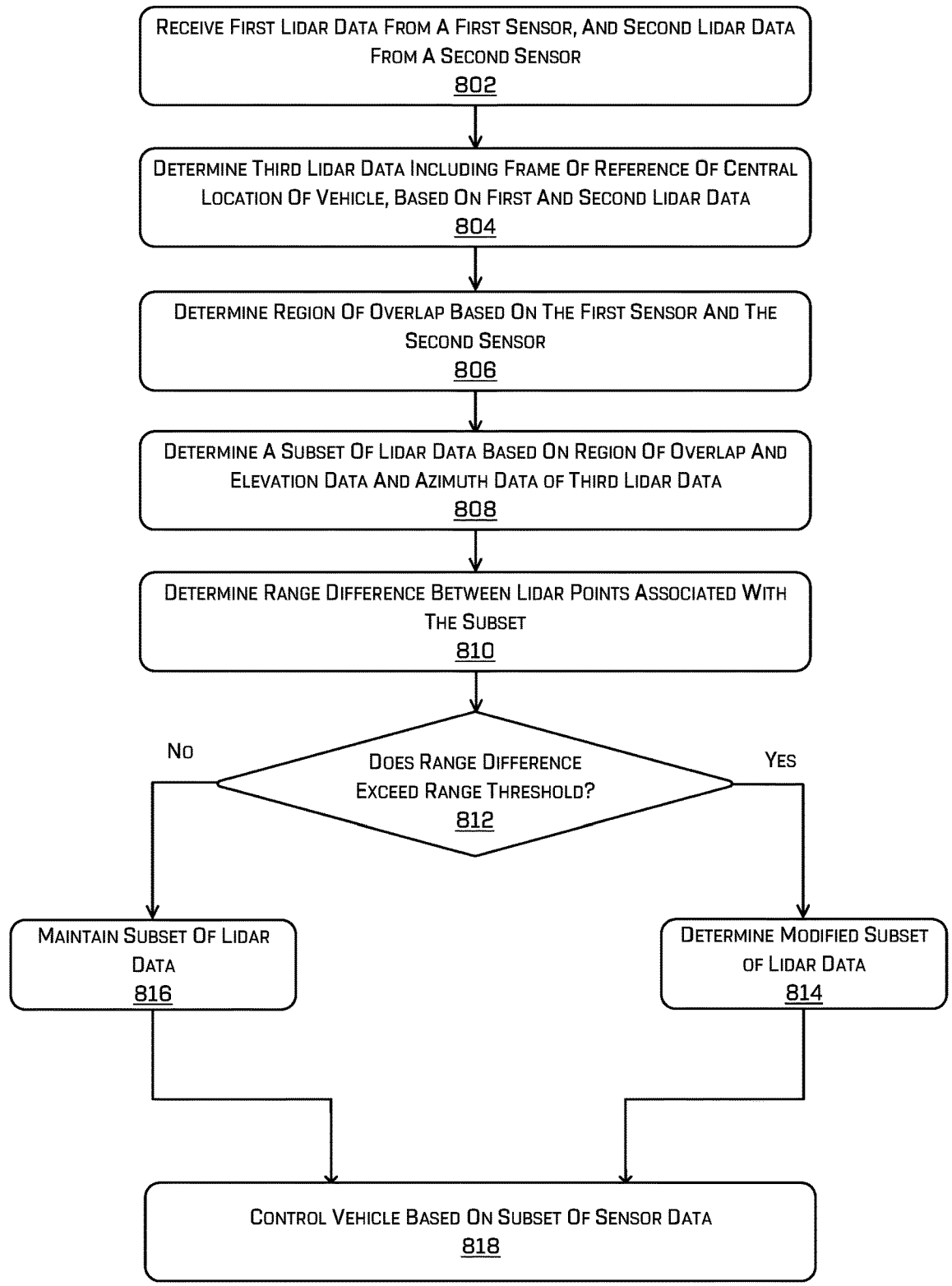
FIG. 8 is a flow diagram illustrating an example process of modifying lidar points by clustering based on comparing lidar ranges to a range difference threshold, in accordance with one or more examples of the disclosure.

FIG. 8 is a flow diagram illustrating an example process 800 of modifying lidar points by clustering based on comparing lidar ranges to a range difference threshold. As described below, process 800 includes operations of receiving lidar data including a first set of lidar points and a second set of lidar points, determining a subset of lidar points based on elevation data and azimuth data of the first set of lidar points and the second set of lidar points, comparing a range difference determined by comparing range values of lidar points of the subset at a similar azimuth and elevation with a range difference threshold, and modifying the subset of lidar points. In various examples, process 800 may be performed by one or more computer-based components configured to implement various functionalities described herein. For instance, some or all of the operations of process 800 may be performed by a mirrored object detector 202 configured to receive multiple sets of lidar points, determine a subset of radar points from the multiple sets of lidar points, analyze range data of lidar points at a particular azimuth and elevation, and/or modify the subset of lidar points based on a range difference exceeding a range difference threshold. As described above, a mirrored object detector 202 may be integrated as an on-vehicle system in some examples.

Process 800 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 802, the mirrored object detector 202 may receive first lidar data from a first lidar device and second lidar data from a second lidar device of an autonomous vehicle traversing within a driving environment. In some examples, the first lidar data may include a first set of lidar points, and the second lidar data may include a second set of lidar points. As described above, lidar devices of an autonomous vehicle may be configured to capture various different types (or parameters) of lidar data, including but not limited to range data, azimuth data, elevation data, velocity data, etc.

At operation 804, the mirrored object detector 202 may determine a subset of lidar data having a common frame of reference, based on the first lidar data and the second lidar data. In some examples, the vehicle may include a number of lidar devices which may capture unique lidar data. Further, the lidar devices may be mounted at different locations on the autonomous vehicle. In some examples, the mirrored object detector 202 may determine a subset of lidar points based on combining the first set of lidar points (e.g., from the first lidar device) with the second set of lidar points (e.g., from the second lidar device) to a single subset of lidar points. In such examples, the subset of lidar points may include a single frame of reference from a central location of the vehicle.

At operation 806, the mirrored object detector 202 may determine a region of overlap, based on the first lidar device and the second lidar device. In some examples, the mirrored object detector 202 may determine a region of overlap based on the first lidar device and the second lidar device. The region of overlap may be an area within which the first lidar device and the second lidar device capture lidar data. In some examples, the mirrored object detector 202 may modify the subset of lidar points to include the lidar points of the subset which are from within the region of overlap.

At operation 808, the mirrored object detector 202 may determine a second subset of lidar points based on azimuth data and elevation data. In some examples, the mirrored object detector 202 may determine (e.g., cluster) the modified subset of lidar points by clustering the lidar points of the modified subset based on elevation data and azimuth data. In such examples, since the second subset of lidar points include lidar data from two lidar devices, the mirrored object detector 202 may identify two (e.g., or more) lidar points at each azimuth and elevation.

At operation 810, the mirrored object detector 202 may determine a range difference based on comparing a first range of a first lidar point with a second range of a second lidar point. In some examples, the mirrored object detector 202 may evaluate the lidar points of the second subset based on identifying a first lidar point and a second lidar point associated with a particular azimuth and elevation. The mirrored object detector 202 may determine a range difference by comparing a first range of the first lidar point with a second range of the second lidar point. In some examples, the mirrored object detector 202 may evaluate the second subset of lidar points by analyzing the lidar points at each azimuth and elevation.

At operation 812, the mirrored object detector 202 may determine whether the range difference exceeds a range difference threshold. In some examples, the mirrored object detector 202 may compare the range difference with a range difference threshold. The range difference threshold may be a threshold above which the mirrored object detector may identify one of the lidar points as a mirrored lidar point. In some examples, the range difference threshold may be determined based on a type of detected object, distance to the detected object, vehicle pose, object pose, etc. In some examples, if the range difference exceeds the range difference threshold (812: Yes), then the mirrored object detector 202 may determine a modified subset of lidar points. In some examples, at operation 814, the mirrored object detector may modify the second subset of lidar points by removing the mirrored lidar point from the second subset and/or assigning a lower likelihood value to the mirrored lidar point.

In contrast, if the range difference does not exceed the range difference threshold (812: No), then the mirrored object detector 202 may maintain (e.g., not modify) the second subset of sensor data. In some examples, the mirrored object detector 202 may determine that the range difference does not exceed the range difference threshold. In such examples, at operation 816, the mirrored object detector may determine that estimated range values of the second subset of lidar points are accurate.

At operation 818, the mirrored object detector may control the autonomous vehicle based on the lidar data. For example, the lidar data modified in operation 812, or maintained in operation 814, may be sent to one or more perception components for further processing. In such examples, the lidar data may be used to accurately detect and classify objects within a driving environment. Further, the lidar data may be used to assist in predicting future actions for one or more objects within a driving environment, in addition to predicting future actions for the autonomous vehicle.

Figure 9:
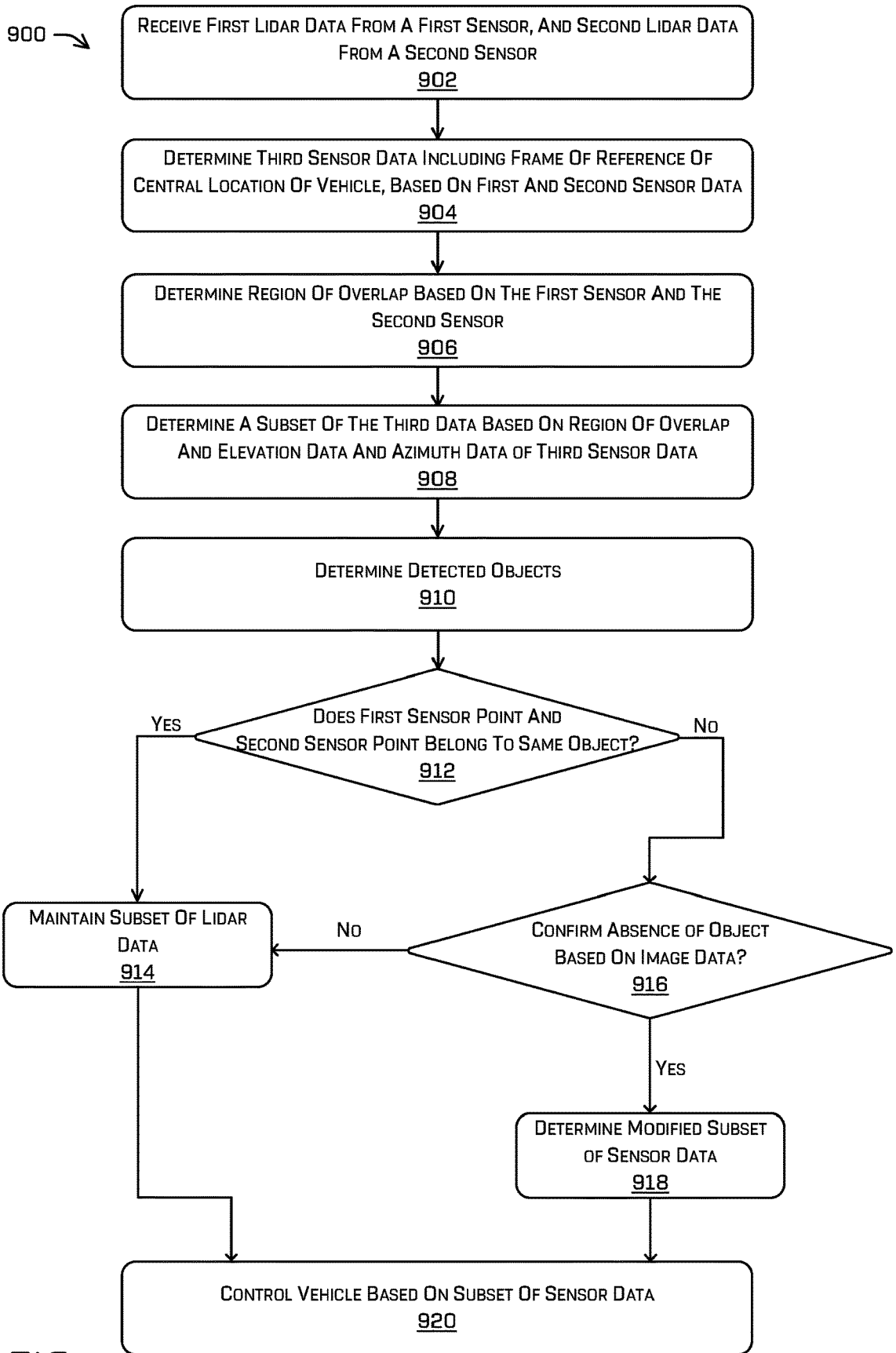
FIG. 9 is a flow diagram illustrating an example process of modifying lidar points by clustering based on determining the presence of lidar points within detected objects, in accordance with one or more examples of the disclosure.

FIG. 9 is a flow diagram illustrating an example process 900 of modifying lidar points by clustering based on determining the presence of lidar points within detected objects. As described below, process 900 includes operations of receiving lidar data including a first set of lidar points and a second set of lidar points, determining a subset of lidar points based on lidar elevation data and azimuth data of the first set of lidar points and the second set of lidar points, determining whether the first lidar point and the second lidar point are associated with a same or different detected object, and modifying the subset of lidar points. In various examples, process 800 may be performed by one or more computer-based components configured to implement various functionalities described herein. For instance, some or all of the operations of process 900 may be performed by a mirrored object detector 202 configured to receive multiple sets of lidar points, determine a subset of lidar points from the multiple sets of lidar points, determine whether lidar points are associated with the same detected objects, and/or modify the subset of lidar points based on a lidar points being associated with different detected objects. As described above, a mirrored object detector 202 may be integrated as an on-vehicle system in some examples.

Process 900 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 902, the mirrored object detector 202 may receive first lidar data from a first lidar device and second lidar data from a second lidar device of an autonomous vehicle traversing within a driving environment. In some examples, the first lidar data may include a first set of lidar points, and the second lidar data may include a second set of lidar points. As described above, lidar devices of an autonomous vehicle may be configured to capture various different types (or parameters) of lidar data, including but not limited to range data, azimuth data, elevation data, velocity data, etc.

At operation 904, the mirrored object detector 202 may determine a subset of lidar data having a common frame of reference, based on the first lidar data and the second lidar data. In some examples, the vehicle may include a number of lidar devices which may capture unique lidar data. Further, the lidar devices may be mounted at different locations on the autonomous vehicle. In some examples, the mirrored object detector 202 may determine a subset of lidar points based on combining the first set of lidar points (e.g., from the first lidar device) with the second set of lidar points (e.g., from the second lidar device) to a single subset of lidar points. In such examples, the subset of lidar points may include a single frame of reference from a central location of the vehicle.

At operation 906, the mirrored object detector 202 may determine a region of overlap, based on the first lidar device and the second lidar device. In some examples, the mirrored object detector 202 may determine a region of overlap based on the first lidar device and the second lidar device. The region of overlap may be an area within which the first lidar device and the second lidar device capture lidar data. In some examples, the mirrored object detector 202 may modify the subset of lidar points to include the lidar points of the subset which are from within the region of overlap.

At operation 908, the mirrored object detector 202 may determine a second subset of lidar points based on azimuth data and elevation data. In some examples, the mirrored object detector 202 may determine (e.g., cluster) the modified subset of lidar points by clustering the lidar points of the modified subset based on elevation data and azimuth data. In such examples, since the second subset of lidar points include lidar data from two lidar devices, the mirrored object may identify two (e.g., or more) lidar points at each azimuth and elevation, one for each lidar device.

At operation 910, the mirrored object detector 202 may determine detected objects. In some examples, the mirrored object detector may determine or generate detected objects within the environment based on the lidar points of the second subset. In some examples, the detected objects may include a number of lidar points. In some examples, the mirrored object detector 202 may determine or generate detected objects based on performing clustering algorithms and/or techniques. In some examples, the clustering algorithms and/or techniques may include determining that a number of lidar points are within a threshold range and/or azimuth from one lidar point to another. Further, such algorithms and/or techniques may include clustering based on range and/or azimuth values.

Examples of techniques for determining detected objects in an environment can be found, for example, in U.S. application Ser. No. 17/405,865, filed Aug. 18, 2021, and titled "Determining Object Characteristics Using Unobstructed Sensor Emissions," the contents of which is herein incorporated by reference in its entirety and for all purposes. Further, such techniques can be found in U.S. application Ser. No. 16/779,576, filed Jan. 31, 2020, and titled "Object Detection And Tracking," the contents of which is herein incorporated by reference in its entirety and for all purposes.

At operation 912, the mirrored object detector 202 may determine whether a first lidar point and a second lidar point of the second subset are associated with the same detected object. In some examples, the mirrored object detector may identify a first lidar point and a second lidar point of the second subset at a particular azimuth and elevation. The mirrored object detector may determine whether the first lidar point and the second lidar point are associated with the same detected object. If the first lidar point and the second lidar point are associated with the same detected object (912: Yes), then the mirrored object detector may maintain (e.g., not modify) the second subset of lidar points. In some examples, the mirrored object detector may determine that the first lidar point and the second lidar point are associated with the same detected object. In such examples, at operation 914, the mirrored object detector may determine that estimated lidar data values of the second subset of lidar points are accurate.

In contrast, if the first lidar point and the second lidar point are associated with different detected objects (912: No), then the mirrored object detector may attempt to confirm the absence of an object based on image data. In some examples, the vehicle may include one or more image capturing sensors (e.g., cameras) configured to capture image data of the driving environment. At operation 916, based on receiving an indication that the first lidar point and the second lidar point are associated with different detected objects, the mirrored object detector may analyze the corresponding region of image data (e.g., the image region corresponding to the same azimuth and elevation range of the lidar object detection) to determine and/or confirm whether the object detected as a mirrored object is present at the location as indicated by the mirrored lidar point identified at operation 912. In such examples, the mirrored object detector may access image data to verify that the mirrored object is not present at the indicated location. If the mirrored object detector does not confirm the absence of an object at the corresponding region of the image data (916: No), then the mirrored object detector may maintain (e.g., not modify) the second subset of lidar points.

In contrast, if the mirrored object detector confirms the absence of an object at the corresponding region of the image data (916: Yes), then the mirrored object detector 202 may determine a modified subset of lidar points. At operation 918, the mirrored object detector may modify the second subset of lidar points by removing the mirrored lidar point from the second subset and/or assigning a lower likelihood value to the mirrored lidar point.

At operation 920, the mirrored object detector may control the autonomous vehicle based on the lidar data. For example, the lidar data modified in operation 918, or maintained in operation 914, may be sent to one or more perception components for further processing. In such examples, the lidar data may be used to accurately detect and classify objects within a driving environment. Further, the lidar data may be used to assist in predicting future actions for one or more objects within a driving environment, in addition to predicting future actions for the autonomous vehicle.

Example Clauses

A. A system comprising: one or more processors; and one or more computer-readable media storing computer-executable instructions that, when executed, cause the one or more processors to perform operations comprising: receiving, from a first lidar device, first lidar data associated with a vehicle operating in an environment; receiving, from a second lidar device, second lidar data associated with the vehicle, wherein the first lidar device and the second lidar device are mounted at different locations of the vehicle; determining a region of overlap between the first lidar data and the second lidar data; determining, based at least in part on the first lidar data and the second lidar data and the region of overlap, third lidar data; determining, based at least in part on elevation data of the third lidar data and azimuth data of the third lidar data, a subset of the third lidar data, wherein the subset includes a set of lidar points; determining a first lidar point of the subset of lidar points and a second lidar point of the subset of lidar points; determining, based at least in part on a first range of the first lidar point and a second range of the second lidar point, a range difference; determining that the range difference of the first range and the second range meets or exceeds a threshold range; determining, based at least in part on the range difference meeting or exceeding the threshold range, a modified subset of lidar points; and controlling, based at least in part on the modified subset of lidar points, the operation of the vehicle.

B. The system of clause A, further comprising: receiving, from a camera, image data; determining, based at least in part on the subset of lidar data, a potential mirrored object; and determining an absence of the potential mirrored object within the image data.

C. The system of clause A or B, further comprising: determining, based at least in part on the subset of lidar points, a first object detection in the environment; determining, based at least in part on the subset of lidar points, a second object detection in the environment, wherein the second object detection is different than the first object detection; and determining that the first lidar point is associated with the first object detection and the second lidar point is associated with the second object detection.

D. The system of any of clauses A-C, wherein the determining the modified subset of sensor points comprises at least one of: assigning a confidence level to a lidar point of the subset; or removing a sensor point of the subset.

E. The system of any of clauses A-D, wherein the threshold range is based on any one of: a type of object from which the first lidar point or the second lidar point reflected; a distance from the vehicle to the object; a first pose of the vehicle; or a second pose of the object.

F. One or more non-transitory computer-readable media storing instructions executable by a processor, wherein the instructions, when executed, cause the processor to perform operations comprising: receiving, from a first sensor, first sensor data associated with a vehicle operating in an environment; receiving, from a second sensor, second sensor data associated with the vehicle; determining a region of overlap between the first sensor data and the second sensor data; determining, based at least in part on the first sensor data and the second sensor data and the region of overlap, third sensor data; determining, based at least in part on elevation data of the third sensor data and azimuth data of the third sensor data, a subset of the third sensor data; determining a range difference associated with the subset of sensor data; and determining, based at least in part on the range difference, a modified subset of sensor points.

G. The one or more non-transitory computer-readable media of clause F, the operations further comprising: receiving, from a camera, image data; and determining, based at least in part on the subset of sensor data, a potential mirrored object; and determining an absence of the potential mirrored object within the image data.

H. The one or more non-transitory computer-readable media of clauses F or G, the operations further comprising: determining a first sensor point from the subset of sensor points and second sensor point from the subset of sensor points; determining, based at least in part on the subset of sensor data, a first object; determining, based at least in part on the subset of sensor data, a second object; and determining that the first sensor point is associated with the first object and the second sensor point is associated with the second object.

I. The one or more non-transitory computer-readable media of any of clauses F-H, wherein the determining the modified subset of sensor points comprises at least one of: assigning a confidence level to a sensor point of the subset of sensor points; or removing a sensor point in the subset of sensor points.

J. The one or more non-transitory computer-readable media of any of clauses F-I, wherein the region of overlap is in front of the vehicle or on a side of the vehicle.

K. The one or more non-transitory computer-readable media of any of clauses F-J, the operations further comprising: determining a range threshold, wherein determining the range threshold comprises any one of: a type of object from which a sensor point of the subset reflected; a distance from the vehicle to the object; a first pose of the vehicle; or a second pose of the object.

L. The one or more non-transitory computer-readable media of any of clauses F-K, wherein the operations further comprise: determining, based at least in part on an object type associated with the subset of sensor data, a threshold; and determining that the range difference meets or exceeds a threshold.

M. The one or more non-transitory computer-readable media of any of clauses F-M, wherein modifying the subset of sensor points comprises determining the modified subset of sensor points by removing at least one sensor point from the subset, the operations further comprising: controlling, based at least in part on the modified subset of sensor points, the operation of the vehicle.

N. A method comprising: receiving, from a first sensor, first sensor data associated with a vehicle operating in an environment; receiving, from a second sensor, second sensor data associated with the vehicle; determining a region of overlap between the first sensor data and the second sensor data; determining, based at least in part on the first sensor data and the second sensor data and the region of overlap, third sensor data; determining, based at least in part on elevation data of the third sensor data and azimuth data of the third sensor data, a subset of the third sensor data; determining a range difference associated with the subset of sensor data; and determining, based at least in part on the range difference, a modified subset of sensor points.

O. The method of clause N, further comprising: receiving, from a camera, image data; and determining, based at least in part on the subset of sensor data, a potential mirrored object; and determining an absence of the potential mirrored object within the image data.

P. The method of clauses N or O, further comprising: determining a first sensor point from the subset of sensor points and second sensor point from the subset of sensor points; determining, based at least in part on the subset of sensor data, a first object; determining, based at least in part on the subset of sensor data, a second object; and determining that the first sensor point is associated with the first object and the second sensor point is associated with the second object.

Q. The method of any of clauses N-P, wherein the determining the modified subset of sensor points comprises at least one of: assigning a confidence level to a sensor point of the subset of sensor points; or removing a sensor point in the subset of sensor points.

R. The method of any of clauses N-Q, further comprising: determining a range threshold, wherein determining the range threshold comprises any one of: a type of object from which a sensor point of the subset reflected; a distance from the vehicle to the object; a first pose of the vehicle; or a second pose of the object.

S. The method of any of clauses N-R, further comprising: determining, based at least in part on an object type associated with the subset of sensor data, a threshold; and determining that the range difference meets or exceeds a threshold.

T. The method of any of clauses N-S, wherein modifying the subset of sensor points comprises determining the modified subset of sensor points by removing at least one sensor point from the subset, further comprising: controlling, based at least in part on the modified subset of sensor points, the operation of the vehicle.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more computer-readable media storing computer-executable instructions that, when executed, cause the one or more processors to perform operations comprising:
receiving, from a first lidar device, first lidar data associated with a vehicle operating in an environment;
receiving, from a second lidar device, second lidar data associated with the vehicle, wherein the first lidar device and the second lidar device are mounted at different locations of the vehicle;
determining a region of overlap between the first lidar data and the second lidar data;
determining, based at least in part on the first lidar data and the second lidar data and the region of overlap, third lidar data;
determining, based at least in part on elevation data of the third lidar data and azimuth data of the third lidar data, a subset of the third lidar data, wherein the subset includes a set of lidar points;
determining a first lidar point of the subset of the third lidar data and a second lidar point of the subset of the third lidar data;
determining, based at least in part on a first range of the first lidar point and a second range of the second lidar point, a range difference;
determining that the range difference of the first range and the second range meets or exceeds a threshold range;
determining, based at least in part on the range difference meeting or exceeding the threshold range, a modified subset of lidar points; and
controlling, based at least in part on the modified subset of lidar points, operation of the vehicle including modifying a trajectory of the vehicle.

2. The system of claim 1, further comprising:
receiving, from a camera, image data;
determining, based at least in part on the subset of the third lidar data, a potential mirrored object; and
determining an absence of the potential mirrored object within the image data.

3. The system of claim 1, further comprising:
   determining, based at least in part on the subset of the third lidar data, a first object detection in the environment;
   determining, based at least in part on the subset of the third lidar data, a second object detection in the environment, wherein the second object detection is different than the first object detection; and
   determining that the first lidar point is associated with the first object detection and the second lidar point is associated with the second object detection.

4. The system of claim 1, wherein determining the modified subset of lidar points comprises at least one of:
   assigning a confidence level to a lidar point of the subset; or
   removing a sensor point of the subset.

5. The system of claim 1, wherein the threshold range is based on any one of:
   a type of object from which the first lidar point or the second lidar point reflected;
   a distance from the vehicle to the object;
   a first pose of the vehicle; or
   a second pose of the object.

6. One or more non-transitory computer-readable media storing instructions executable by a processor, wherein the instructions, when executed, cause the processor to perform operations comprising:
   receiving, from a first sensor, first sensor data associated with a vehicle operating in an environment;
   receiving, from a second sensor, second sensor data associated with the vehicle;
   determining a region of overlap between the first sensor data and the second sensor data;
   determining, based at least in part on the first sensor data and the second sensor data and the region of overlap, third sensor data;
   determining, based at least in part on elevation data of the third sensor data and azimuth data of the third sensor data, a subset of the third sensor data;
   determining a range difference associated with the subset of the third sensor data;
   determining, based at least in part on the range difference, a modified subset of sensor points; and
   controlling, based at least in part on the modified subset of sensor points, operation of the vehicle including modifying a trajectory of the vehicle.

7. The one or more non-transitory computer-readable media of claim 6, the operations further comprising:
   receiving, from a camera, image data; and
   determining, based at least in part on the subset of the third sensor data, a potential mirrored object; and
   determining an absence of the potential mirrored object within the image data.

8. The one or more non-transitory computer-readable media of claim 6, the operations further comprising:
   determining a first sensor point from the subset of the third sensor data and second sensor point from the subset of the third sensor data;
   determining, based at least in part on the subset of the third sensor data, a first object;
   determining, based at least in part on the subset of the third sensor data, a second object, determining that the first sensor point is associated with the first object and the second sensor point is associated with the second object.

9. The one or more non-transitory computer-readable media of claim 6, wherein determining the modified subset of sensor points comprises at least one of:
   assigning a confidence level to a sensor point of the subset of the third sensor data; or
   removing a sensor point in the subset of the third sensor data.

10. The one or more non-transitory computer-readable media of claim 6, wherein the region of overlap is in front of the vehicle or on a side of the vehicle.

11. The one or more non-transitory computer-readable media of claim 6, the operations further comprising:
    determining a range threshold, wherein determining the range threshold comprises any one of:
    a type of object from which a sensor point of the subset reflected;
    a distance from the vehicle to the object;
    a first pose of the vehicle; or
    a second pose of the object.

12. The one or more non-transitory computer-readable media of claim 6, wherein the operations further comprise:
    determining, based at least in part on an object type associated with the subset of the third sensor data, a threshold; and
    determining that the range difference meets or exceeds a threshold.

13. The one or more non-transitory computer-readable media of claim 6, wherein modifying the subset of the third sensor data comprises determining the modified subset of sensor points by removing at least one sensor point from the subset, the operations further comprising:
    controlling, based at least in part on the modified subset of sensor points, the operation of the vehicle.

14. A method comprising:
    receiving, from a first sensor, first sensor data associated with a vehicle operating in an environment;
    receiving, from a second sensor, second sensor data associated with the vehicle;
    determining a region of overlap between the first sensor data and the second sensor data;
    determining, based at least in part on the first sensor data and the second sensor data and the region of overlap, third sensor data;
    determining, based at least in part on elevation data of the third sensor data and azimuth data of the third sensor data, a subset of the third sensor data;
    determining a range difference associated with the subset of the third sensor data;
    determining, based at least in part on the range difference, a modified subset of sensor points; and
    controlling, based at least in part on the modified subset of sensor points, operation of the vehicle including modifying a trajectory of the vehicle.

15. The method of claim 14, further comprising:
    receiving, from a camera, image data; and
    determining, based at least in part on the subset of the third sensor data, a potential mirrored object; and
    determining an absence of the potential mirrored object within the image data.

16. The method of claim 14, further comprising:
    determining a first sensor point from the subset of the third sensor data and second sensor point from the subset of the third sensor data;
    determining, based at least in part on the subset of the third sensor data, a first object;
    determining, based at least in part on the subset of the third sensor data, a second object;

and determining that the first sensor point is associated with the first object and the second sensor point is associated with the second object.

17. The method of claim 14, wherein determining the modified subset of sensor points comprises at least one of:
assigning a confidence level to a sensor point of the subset of the third sensor data; or
removing a sensor point in the subset of the third sensor data.

18. The method of claim 14, further comprising:
determining a range threshold, wherein determining the range threshold comprises any one of:
a type of object from which a sensor point of the subset reflected;
a distance from the vehicle to the object;
a first pose of the vehicle; or
a second pose of the object.

19. The method of claim 14, further comprise:
determining, based at least in part on an object type associated with the subset of the third sensor data, a threshold; and
determining that the range difference meets or exceeds a threshold.

20. The method of claim 14, wherein modifying the subset of the third sensor data comprises determining the modified subset of sensor points by removing at least one sensor point from the subset, further comprising:
controlling, based at least in part on the modified subset of sensor points, the operation of the vehicle.

* * * * *